US010075363B2

(12) United States Patent
Goliya et al.

(10) Patent No.: US 10,075,363 B2
(45) Date of Patent: Sep. 11, 2018

(54) AUTHORIZATION FOR ADVERTISED ROUTES AMONG LOGICAL ROUTERS

(71) Applicant: Nicira, Inc., Palo Alto, CA (US)

(72) Inventors: Abhishek Goliya, Pune (IN); Uday Masurekar, Sunnyvale, CA (US); Minjal Agarwal, Ahmedabad (IN)

(73) Assignee: NICIRA, INC., Palo Alto, CA (US)

( * ) Notice: Subject to any disclaimer, the term of this patent is extended or adjusted under 35 U.S.C. 154(b) by 113 days.

(21) Appl. No.: 14/925,015

(22) Filed: Oct. 28, 2015

(65) Prior Publication Data

US 2017/0063633 A1 Mar. 2, 2017

(30) Foreign Application Priority Data

Aug. 31, 2015 (IN) .......................... 4598/CHE/2015

(51) Int. Cl.
| | |
|---|---|
| H04L 12/755 | (2013.01) |
| H04L 12/751 | (2013.01) |
| H04L 12/713 | (2013.01) |
| H04L 12/24 | (2006.01) |
| H04L 12/715 | (2013.01) |
| H04L 12/721 | (2013.01) |

(52) U.S. Cl.
CPC ............ *H04L 45/021* (2013.01); *H04L 41/12* (2013.01); *H04L 45/02* (2013.01); *H04L 45/586* (2013.01); *H04L 45/72* (2013.01); *H04L 45/04* (2013.01)

(58) Field of Classification Search
CPC ..... H04L 45/02; H04L 12/4633; H04L 41/12; H04L 45/04; H04L 45/306; H04L 45/507; H04L 45/586; H04L 45/72; H04L 45/021
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,751,967 A | 5/1998 | Raab et al. |

(Continued)

FOREIGN PATENT DOCUMENTS

| | | |
|---|---|---|
| EP | 1653688 | 5/2006 |
| EP | 3013006 A1 | 4/2016 |

(Continued)

OTHER PUBLICATIONS

Agarwal, Sugam, et al., "Traffic Engineering in Software Defined Networks," 2013 192. Proceedings IEEE INFOCOM, Apr. 14, 2013, pp. 2211-2219, Bell Labs, Alcatel-Lucent, Holmdel, NJ, USA.

(Continued)

*Primary Examiner* — Ashley Shivers
(74) *Attorney, Agent, or Firm* — Adeli LLP

(57) ABSTRACT

Some embodiments provide a method for configuring a set of logical routers in a logical network. The method receives a configuration of an advertised route for a first logical router and a set of allowable routes for a second logical router to which the first logical router connects. The method determines whether the set of allowable routes for the second logical router includes the advertised route as an allowed route from the first logical router. Only when the advertised route is an allowed route from the first logical router, the method adds the advertised route to a routing table for at least one component of the second logical router.

20 Claims, 17 Drawing Sheets

(56) References Cited

U.S. PATENT DOCUMENTS

| | | |
|---|---|---|
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 * | 4/2013 | Marshall .............. H04L 41/0806 370/252 |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,021,066 B1 | 4/2015 | Singh et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,647,883 B2 | 5/2017 | Neginhal et al. |
| 9,787,605 B2 | 10/2017 | Zhang et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0206591 A1 * | 9/2007 | Doviak ............... H04L 12/5692 370/389 |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |

(56) References Cited

U.S. PATENT DOCUMENTS

| | | |
|---|---|---|
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1* | 2/2013 | Zhang ............... H04L 47/12 370/401 |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koomstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0063360 A1 | 3/2015 | Thakkar et al. |
| 2015/0089082 A1 | 3/2015 | Patwardhan et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0294612 A1* | 10/2016 | Ravinoothala ...... H04L 41/0803 |
| 2016/0344586 A1* | 11/2016 | Ganichev ............ H04L 41/0806 |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0126497 A1 | 5/2017 | Dubey et al. |
| 2017/0230241 A1 | 8/2017 | Neginhal et al. |
| 2018/0006943 A1 | 1/2018 | Dubey |
| 2018/0062914 A1 | 3/2018 | Boutros et al. |

FOREIGN PATENT DOCUMENTS

| | | |
|---|---|---|
| JP | 2003069609 | 3/2003 |
| JP | 2003124976 | 4/2003 |
| JP | 2003318949 | 11/2003 |
| WO | 2005112390 | 11/2005 |
| WO | 2008095010 | 8/2008 |
| WO | 2013184846 | 12/2013 |

OTHER PUBLICATIONS

Lowe, Scott, "Learning NSX, Part 14: Using Logical Routing," Scott's Weblog: The weblog of an IT pro specializing in virtualization, networking, open source, and cloud computing, Jun. 20, 2014, 8 pages, available at http://blog.scottlowe.org/2014/06/20/learning-nsx-part-14-using-logical-routing/.

Fernando, Cisco, R., et al., "Service Chaining using Virtual Networks with BGP," Internet Engineering Task Force, IETF, Jul. 7, 2015, pp. 1-32, Internet Society (ISOC), Geneva, Switzerland, available at https://tools.ietf.org/html/draft-fm-bess-service-chaining-01.

Vmware, Inc., "Vmware® NSX Network Virtualization Design Guide," 2013, 32 pages, Item No. VMW-NSX-NTWK-VIRT-DESN-GUIDE-V2-101, Palo Alto, CA, USA.

Aggarwal, R. et al., "Data Center Mobility based on E-VPN, BGP/MPLS IP VPN, IP Routing and NHRP; draft-raggarwa-data-center-mobility-05.txt," Jun. 10, 2013, 24 pages, Internet Engineering Task Force, IETF, Standworkingdraft, Internet Society (ISOC) 4, Rue Des Falaises CH-1205, Geneva, Switzerland.

(56) References Cited

OTHER PUBLICATIONS

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation, Apr. 2005, 14 pages, USENIX Association.

Dobrescu, Mihai, et al., "RouteBricks: Exploiting Parallelism to Scale Software Routers," SOSP '09, Proceedings of the ACM SIGOPS 22nd Symposium on Operating Systems Principles, Oct. 2009, 17 pages, ACM New York, NY.

Dumitriu, Dan Mihai, et al. (U.S. Appl. No. 61/514,990), "Method and Apparatus for Computing", filed Aug. 4, 2011, 31 pages.

Handley, Mark, et al., "Designing Extensible IP Router Software," Proc. of NSDI, May 2005, 14 pages.

Kim, Changhoon, et al., "Revisiting Route Caching: The World Should be Flat," in Proc. of PAM, Month Unknown, 10 pages.

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Lakshminarayanan, Karthik, et al., "Routing as a Service," Month Unknown, 2004, 15 pages, Berkeley, California.

Maltz, David A., et al., "Routing Design in Operational Networks: A Look from the Inside," SIGCOMM '04, Aug. 30-Sep. 3, 2004, 14 pages, ACM, Portland, Oregon, USA.

Pelissier, Joe, "Network Interface Virtualization Review," Jan. 2009, 38 pages.

Rosen, E., et al., "Applicability Statement for BGPMPLS IP Virtual Private Networks (VPNs)," The Internet Society, RFC 4365, Feb. 2006, 32 pages.

Shenker, Scott, et al., "The Future of Networking, and the Past of Protocols," Dec. 2, 2011, 30 pages, USA.

Nang, Anjing, et al., "Network Virtualization: Technologies, Perspectives, and Frontiers," Journal of Lightwave Technology, Feb. 2013, 15 pages, IEEE.

Wang, Yi, et al., "Virtual Routers on the Move: Live Router Migration as a Network-management Primitive," SIGCOMM 08, Aug. 17-22, 2008, 12 pages, ACM, Seattle, Washington, USA.

\* cited by examiner

AUTHORIZATION FOR ADVERTISED ROUTES AMONG LOGICAL ROUTERS

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In logical networks, user-defined data compute nodes (e.g., virtual machines) on different subnets may need to communicate with each other as well. In this case, tenants may define a network for virtualization that includes both logical switches and logical routers. Methods for implementing the logical routers to adequately serve such virtualized logical networks in datacenters are needed.

BRIEF SUMMARY

Some embodiments provide a method for configuring a set of logical routers arranged hierarchically in a logical network (e.g., for implementation in a datacenter), specifically for handling route advertisement by lower tier routers to higher tier routers. The hierarchical arrangement of logical routers of some embodiments includes a logical router at a first (higher) tier and one or more logical routers at a second (lower) tier, with the second tier routers only able to communicate with each other, with higher tier routers, or with a physical network external to the logical network through the first tier logical router.

In order for the second tier routers to receive data traffic from the first tier logical router, the second tier routers of some embodiments advertise routes for particular subnets. Whereas in physical routing networks route advertisement is handled by a routing protocol such as BGP or OSPF, in the case of a logical network the routing tables for the logical routers are all maintained by a centralized network controller or network controller cluster. Thus, the configuration of the logical routers is performed in response to configuration data received (e.g., through an application programming interface (API)) by the network controllers, and involves the generation of routing information by the network controllers based on the received configuration data.

The method of some embodiments receives configuration data indicating that a first logical router (a lower tier router) has a particular set of network addresses (e.g., a network address prefix) set for route advertisement. In addition, in some embodiments the network controller has configuration data for a second logical router (a higher tier router to which the first logical router connects) that specifies allowable network addresses (e.g., network address prefixes) for routes that may be added to the routing table of the second logical router based on route advertisement. In some embodiments, the set of allowable routes specifies allowable network addresses for each logical port (or interface) of the second logical router, such that a route advertised by a particular lower tier logical router is only allowed if the route is for a set of network address that are specified as allowable for the particular logical interface.

When the advertised route is for an allowable network address, the method adds the route to the routing table for the second logical router. In some embodiments, the second logical router includes multiple routing components, and routes are added to each of these routing components. Specifically, in some embodiments the second logical router includes (i) a single distributed routing component and (ii) several centralized routing components (e.g., one centralized routing component for each configured uplink to the external physical network). The method adds a route to the routing table of the distributed routing component that specifies as its next hop address an address of the interface of the first logical router that connects to the second logical router. For each of the centralized routing components, the method adds a route to the components' respective routing table that specifies as its next hop address an address of an interface of the distributed routing component that is internal to the second logical router (e.g., an interface that is automatically defined by the network controller in order to separate the second logical router into multiple routing components).

As mentioned, the set of allowable routes may specify network addresses in terms of address prefixes representing a contiguous block of addresses (e.g., IPv4 addresses using CIDR notation). In some embodiments, the set of allowable routes specifies for each allowable prefix whether only the exact prefix is allowed or whether a range of prefixes may be allowed. For instance, the set of allowable routes might allow routes for the prefix 10.0.0.0/24, but also allow routes for the "/25" prefixes as well by setting a prefix range of 24-25. This would allow routes for the prefixes 10.0.0.0/24, 10.0.0.0/25, and 10.0.0.128/25, but would not allow routes for "/26" prefixes.

In some embodiments, the lower tier logical routers may use network address translation (NAT) to translate addresses of packets sent from data compute nodes in their portion of the logical network (e.g., data compute nodes that logically connect to logical switches which, in turn, logically connect to the lower tier logical router). If these packets are sent to the external physical network through the higher tier logical router, then return packets will need to be routed by the higher tier logical router to the appropriate lower tier logical router. As such, when a NAT configuration is received for the first (lower tier) logical router, some embodiments automatically advertise a route for the NAT network address (i.e., the address to which the first logical router translates the source address of outgoing packets) to the second (higher tier) logical router.

In some embodiments, as described above, the configuration for the second logical router specifies whether to accept or reject the advertised route based on its set of allowable routes, and the route is only added to the routing table for the second logical router when the NAT address is allowed for the interface to which the first logical router connects. Some embodiments allow the second logical router to be configured to allow routes from the first logical router for any address so long as the routes are specified as NAT routes. In other embodiments, however, the second logical router is configured to allow routes only for NAT addresses within a specific pool of addresses, and therefore only add a route for a particular NAT address if the NAT address is within that pool. In other embodiments, the first logical router advertises the entire block of possible NAT addresses rather than advertising the addresses (e.g., as a network prefix) when they are in use, and the second logical router determines whether to allow a route for the network prefix as described above.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 2:
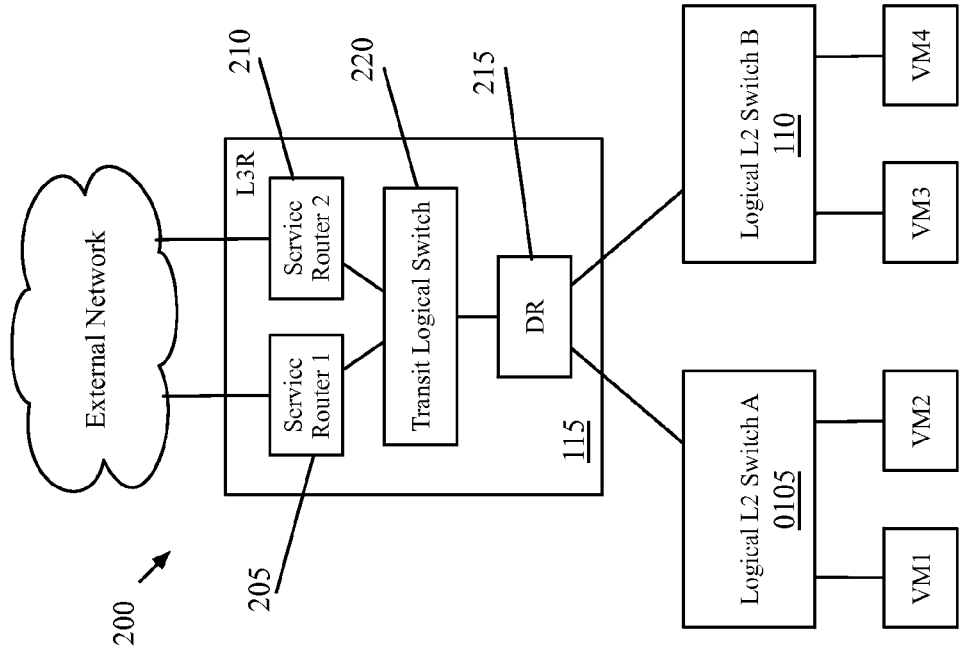
FIG. 2 illustrates a management plane view of the logical network of FIG. 1 when the logical router is implemented in a distributed manner.

Some embodiments provide a method for configuring a set of logical routers arranged hierarchically in a logical network (e.g., for implementation in a datacenter), specifically for handling route advertisement by lower tier routers to higher tier routers. The hierarchical arrangement of logical routers of some embodiments includes a logical router at a first (higher) tier and one or more logical routers at a second (lower) tier, with the second tier routers only able to communicate with each other, with higher tier routers, or with a physical network external to the logical network through the first tier logical router. In some embodiments, the hierarchy is a two-tier hierarchy, with provider logical routers (PLRs) providing the connection to the external physical network and tenant logical routers (TLRs) connecting to the PLRs. Such a hierarchy allows a datacenter owner/provider to configure the connection to the external network, while each tenant can configure their own logical network that connects to the external network through the PLR. Although the inventive concepts discussed herein are applicable to a logical network with any number of hierarchical levels, many of the illustrated and described examples use the two-tier PLR/TLR hierarchy.

In order for the second tier routers to receive data traffic from the first tier logical router, the second tier routers of some embodiments advertise routes for particular subnets. Whereas in physical routing networks route advertisement is handled by a routing protocol such as BGP or OSPF, in the case of a logical network the routing tables for the logical routers are all maintained by a centralized network controller or network controller cluster. Thus, the configuration of the logical routers is performed in response to configuration data received (e.g., through an application programming interface (API)) by the network controllers, and involves the generation of routing information by the network controllers based on the received configuration data.

The method of some embodiments receives configuration data indicating that a first logical router (a lower tier router) has a particular set of network addresses (e.g., a network address prefix) set for route advertisement. In addition, in some embodiments the network controller has configuration data for a second logical router (a higher tier router to which the first logical router connects) that specifies allowable network addresses (e.g., network address prefixes) for routes that may be added to the routing table of the second logical router based on route advertisement. In some embodiments, the set of allowable routes specifies allowable network addresses for each logical port (or interface) of the second logical router, such that a route advertised by a particular lower tier logical router is only allowed if the route is for a set of network address that are specified as allowable for the particular logical interface.

When the advertised route is for an allowable network address, the method adds the route to the routing table for the second logical router. In some embodiments, the second logical router includes multiple routing components, and routes are added to each of these routing components. Specifically, in some embodiments the second logical router includes (i) a single distributed routing component (herein referred to as a distributed router, or DR) and (ii) several centralized routing components (referred to herein as service routers, or SRs). For instance, some embodiments define one centralized routing component for the second logical router for each configured uplink that connects the second logical router to the external physical network. The method adds a route to the routing table of the DR that specifies as its next hop address an address of the interface of the first logical router that connects to the second logical router. For each of the SRs, the method adds a route to the SR's respective routing table that specifies as its next hop address an address of an interface of the DR that is internal to the second logical router (e.g., an interface that is automatically defined by the network controller in order to separate the second logical router into multiple routing components).

As mentioned, the set of allowable routes may specify network addresses in terms of address prefixes representing a contiguous block of addresses (e.g., IPv4 addresses using CIDR notation). In some embodiments, the set of allowable routes specifies for each allowable prefix whether only the exact prefix is allowed or whether a range of prefixes may be allowed. For instance, the set of allowable routes might allow routes for the prefix 10.0.0.0/24, but also allow routes for the "/25" prefixes as well by setting a prefix range of 24-25. This would allow routes for the prefixes 10.0.0.0/24, 10.0.0.0/25, and 10.0.0.128/25, but would not allow routes for "/26" prefixes.

In some embodiments, the lower tier logical routers may use network address translation (NAT) to translate addresses of packets sent from data compute nodes in their portion of the logical network (e.g., data compute nodes that logically connect to logical switches which, in turn, logically connect to the lower tier logical router). If these packets are sent to the external physical network through the higher tier logical router, then return packets will need to be routed by the higher tier logical router to the appropriate lower tier logical router. As such, when a NAT configuration is received for the first (lower tier) logical router, some embodiments automatically advertise a route for the NAT network address (i.e., the address to which the first logical router translates the source address of outgoing packets) to the second (higher tier) logical router.

In some embodiments, as described above, the configuration for the second logical router specifies whether to accept or reject the advertised route based on its set of allowable routes, and the route is only added to the routing table for the second logical router when the NAT address is allowed for the interface to which the first logical router connects. Some embodiments allow the second logical router to be configured to allow routes from the first logical router for any address so long as the routes are specified as NAT routes. In other embodiments, however, the second logical router is configured to allow routes only for NAT addresses within a specific pool of addresses, and therefore only add a route for a particular NAT address if the NAT address is within that pool. In other embodiments, the first logical router advertises the entire block of possible NAT addresses rather than advertising the addresses (e.g., as a network prefix) when they are in use, and the second logical router determines whether to allow a route for the network prefix as described above.

The above introduces the concept of a tiered logical router configuration as well as rules governing route advertisement between the logical routers of some embodiments. In the following, Section I focuses on the overall high-level design of the logical router of some embodiments, while Section II describes the configuration of the various logical router components. Section III describes the rules regarding route advertisement from a lower tier router to a higher tier router of some embodiments, while Section IV describes the handling of NAT rules pushed from the lower tier router to the higher tier router in some embodiments. Finally, Section V describes the electronic system with which some embodiments of the invention are implemented.

I. Logical Router and Physical Implementation

The following discussion describes the design of logical routers for some embodiments as well as the implementation of such logical routers by the network controllers of some embodiments. Logical routers, in some embodiments, exist in three different forms. The first of these forms is the API view, or configuration view, which is how the logical router is defined by a user (e.g., a datacenter provider or tenant). The second view is the control plane, or management plane, view, which is how the network controller internally defines the logical router. Finally, the third view is the physical realization, or implementation of the logical router, which is how the logical router is actually implemented in a datacenter or set of datacenters. That is, the logical router is an abstraction describing a set of functionalities (e.g., routing, NAT, etc.) that a user configures for the logical router. The logical router is then implemented by various machines in the datacenter based on instructions distributed to those machines by a set of network controllers, with the instructions generated by the network controllers according to the configuration provided by the user.

In the control plane view, the logical router of some embodiments may include one or both of a single DR and one or more SRs. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound. The DR, in some embodiments, is responsible for first-hop distributed routing between logical switches and/or other logical routers that are logically connected to the logical router. The SRs of some embodiments are responsible for delivering services that are not implemented in a distributed fashion (e.g., some stateful services).

In some embodiments, the physical realization of a logical router always has a DR (i.e., for first-hop routing). A logical router will have SRs if either (i) the logical router is a PLR, and therefore connects to external physical networks or (ii) the logical router has services configured that do not have a distributed implementation (e.g., NAT, load balancing, DHCP in some embodiments). Even if there are no stateful services configured on a PLR, some embodiments use SRs in the implementation to centralized the connection to the external network.

A. Single-Tier Logical Router

Figure 1:
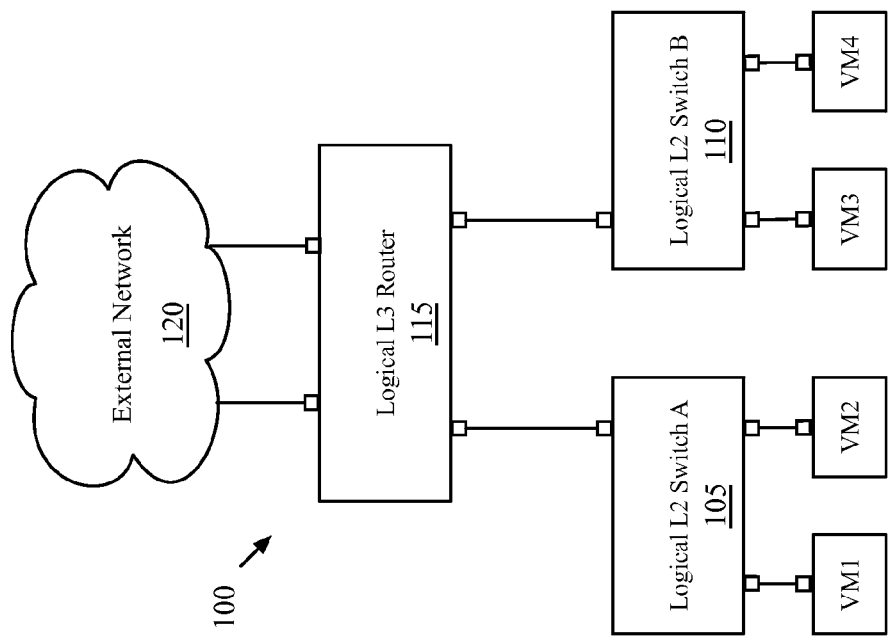
FIG. 1 illustrates a configuration view of a logical router, which represents a logical network as designed by a user.
Figure 3:
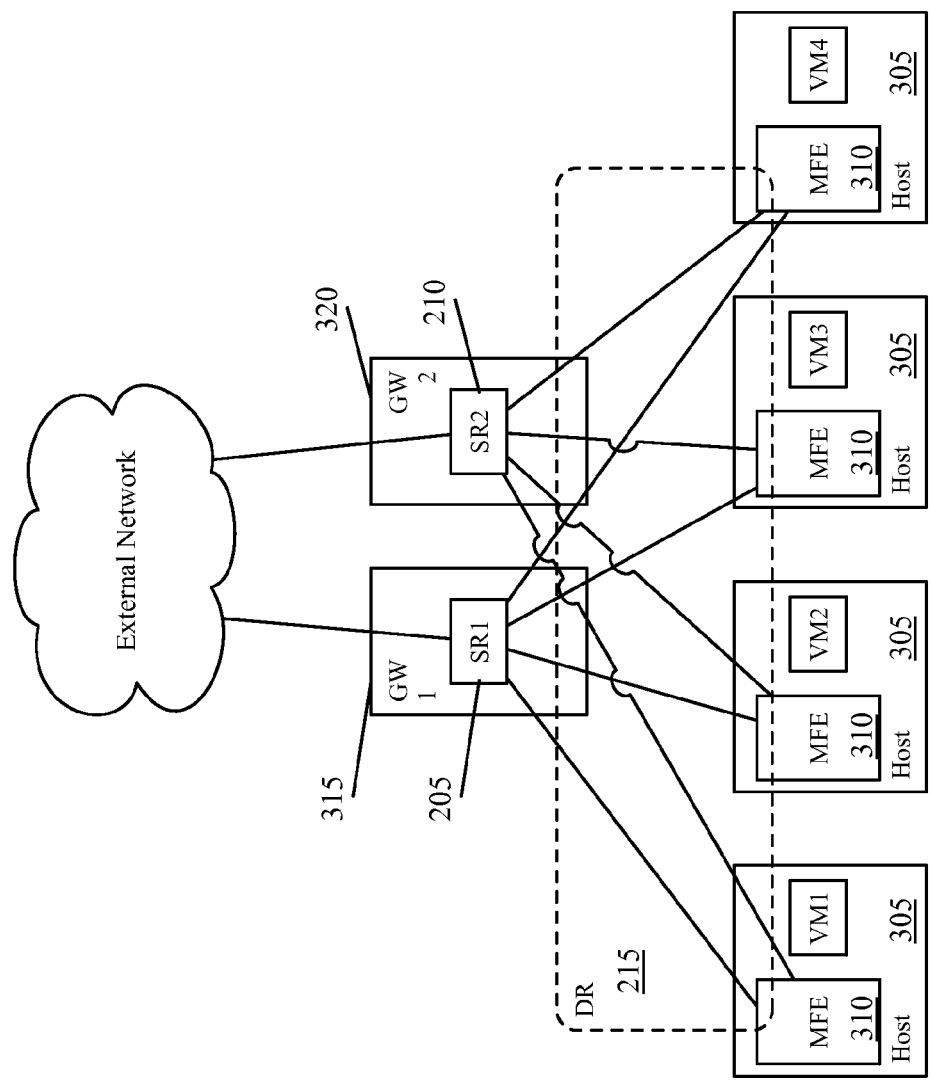
FIG. 3 illustrates a physical distributed implementation of the logical router of FIG. 1.

FIGS. 1-3 illustrate the three different views of a distributed logical router implementation. FIG. 1 specifically illustrates the configuration view, which represents a logical network 100 as designed by a user. As shown, the logical router 115 is part of a logical network 100 that includes the logical router 115 and two logical switches 105 and 110. The two logical switches 105 and 110 each have VMs that connect to logical ports. While shown as VMs in these figures, it should be understood that other types of data compute nodes (e.g., namespaces, etc.) may connect to logical switches in some embodiments. The logical router 115 also includes two ports that connect to the external physical network 120.

FIG. 2 illustrates the management plane view 200 of the logical network 100. The logical switches 105 and 110 are the same in this view as the configuration view, but the network controller has created two service routers 205 and 210 for the logical router 115, as well as a distributed router 215 and a transit logical switch 220. The DR 215 includes a southbound interface for each of the logical switches 105 and 110, and a single northbound interface to the transit logical switch 220 (and through this to the SRs). The SRs 205 and 210 each include a single southbound interface to the transit logical switch 220 (used to communicate with the DR 215, as well as each other in certain situations). Each SR 205 and 210 also corresponds to an uplink port of the logical router (that connects to the external network), and thus each of the SRs has a single such interface.

The detailed configuration of the northbound and southbound interfaces of the various router constructs 205-215 and their connections with the transit logical switch 220 will be described in further detail below. In some embodiments, the management plane generates separate routing information bases (RIBs) for each of the router constructs 205-215. That is, in addition to having separate objects created in the management/control plane, each of the router constructs 205 is treated as a separate router with separate routes.

Finally, FIG. 3 illustrates a physical implementation of the logical router 100. As shown, each of the VMs that couples to one of the logical switches 105 and 110 in the logical network 100 resides on a host machine 305. The MFEs 310 that operate on these host machines in some embodiments are virtual switches (e.g., Open vSwitch (OVS), ESX) that operate within the hypervisors or other virtualization software on the host machines. These MFEs perform first-hop switching and routing to implement the logical switches 105 and 110, and the logical router 115, for packets sent by the VMs of the logical network 100. The MFEs 310 (or a subset of them) also may implement logical switches (and distributed logical routers) for other logical networks if the other logical networks have VMs that reside on the host machines 305 as well.

The two SRs 205 and 210 each operate on a different gateway machine 315 and 320. The gateway machines 315 and 320 are host machines similar to the machines 305 in some embodiments, but host SRs rather than user VMs. In some embodiments, the gateway machines 315 and 320 each include an MFE as well as the SR, in order for the MFE to handle logical switching as well as routing for the DR 215. For instance, packets sent from the external network 120 may be routed by the SR routing table on one of the gateway machines and then subsequently switched and routed (according to the DR routing table) by the MFE on the same gateway.

The SRs may be implemented in a namespace, a virtual machine, or as a VRF in different embodiments. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs 310 are configured to send packets via a tunnel to the active SR (or to the MFE on the gateway machine with the active SR). Only if the tunnel is down will the MFE send packets to the standby gateway.

B. Multi-Tier Topology

Figure 4:
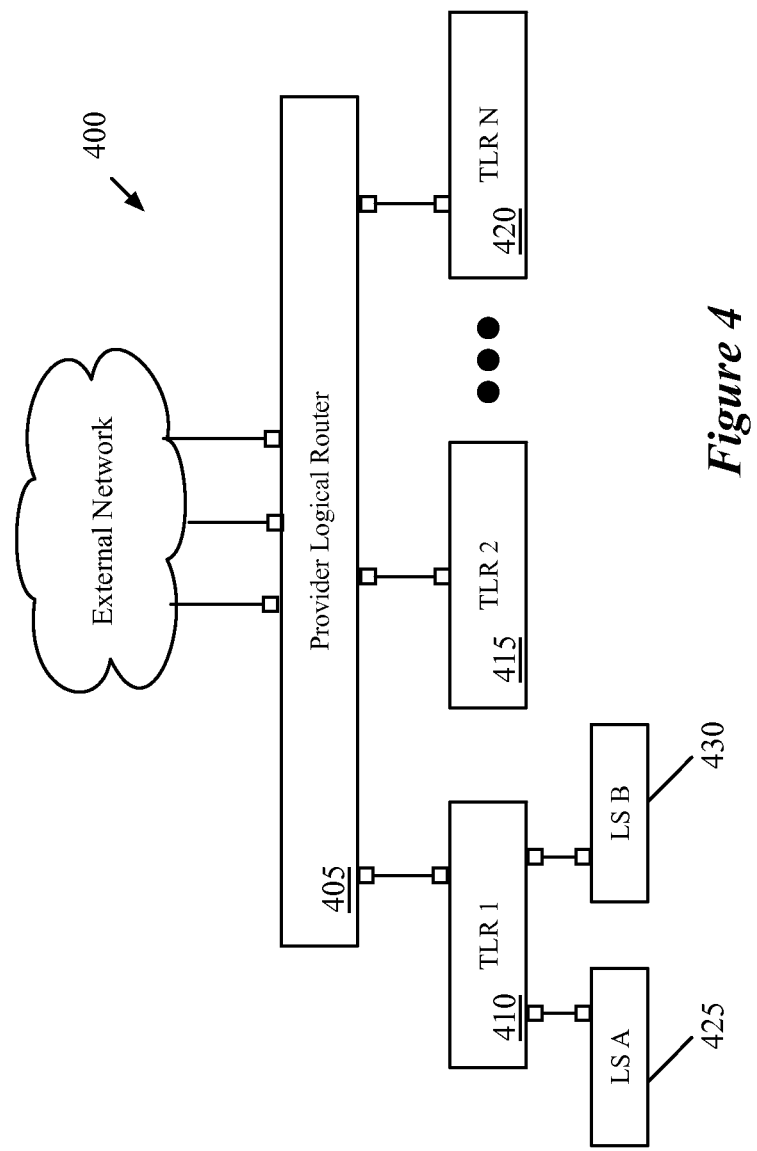
FIG. 4 conceptually illustrates a logical network with two tiers of logical routers.

The previous example illustrates only a single tier of logical router. For logical networks with multiple tiers of logical routers, some embodiments may include both DRs and SRs at each level, or DRs and SRs at the upper level (the PLR tier) with only DRs at the lower level (the TLR tier). FIG. 4 conceptually illustrates a multi-tier logical network 400 of some embodiments, with FIGS. 5 and 6 illustrating two different management plane views of the logical networks.

FIG. 4 conceptually illustrates a logical network 400 with two tiers of logical routers. As shown, the logical network 400 includes, at the layer 3 level, a provider logical router 405 and several tenant logical routers 410-420. The first tenant logical router 410 has two logical switches 425 and 430 attached, with one or more data compute nodes coupling to each of the logical switches. For simplicity, only the logical switches attached to the first TLR 410 are shown, although the other TLRs 415-420 would typically have logical switches attached (to which data compute nodes couple).

In some embodiments, any number of TLRs may be attached to a PLR such as the PLR 405. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR (because, e.g., the routing table for the PLR might get too big). Part of the routing table for a PLR includes routes for all of the logical switch domains of its TLRs, so attaching numerous TLRs to a PLR creates several routes for each TLR just based on the subnets attached to the TLR. The PLR 405, as shown in the figure, provides a connection to the external physical network 435; some embodiments only allow the PLR to provide such a connection, so that the datacenter provider can manage this connection. Each of the separate TLRs 410-420, though part of the logical network 400, are configured independently (although a single tenant could have multiple TLRs if they so chose).

Figure 5:
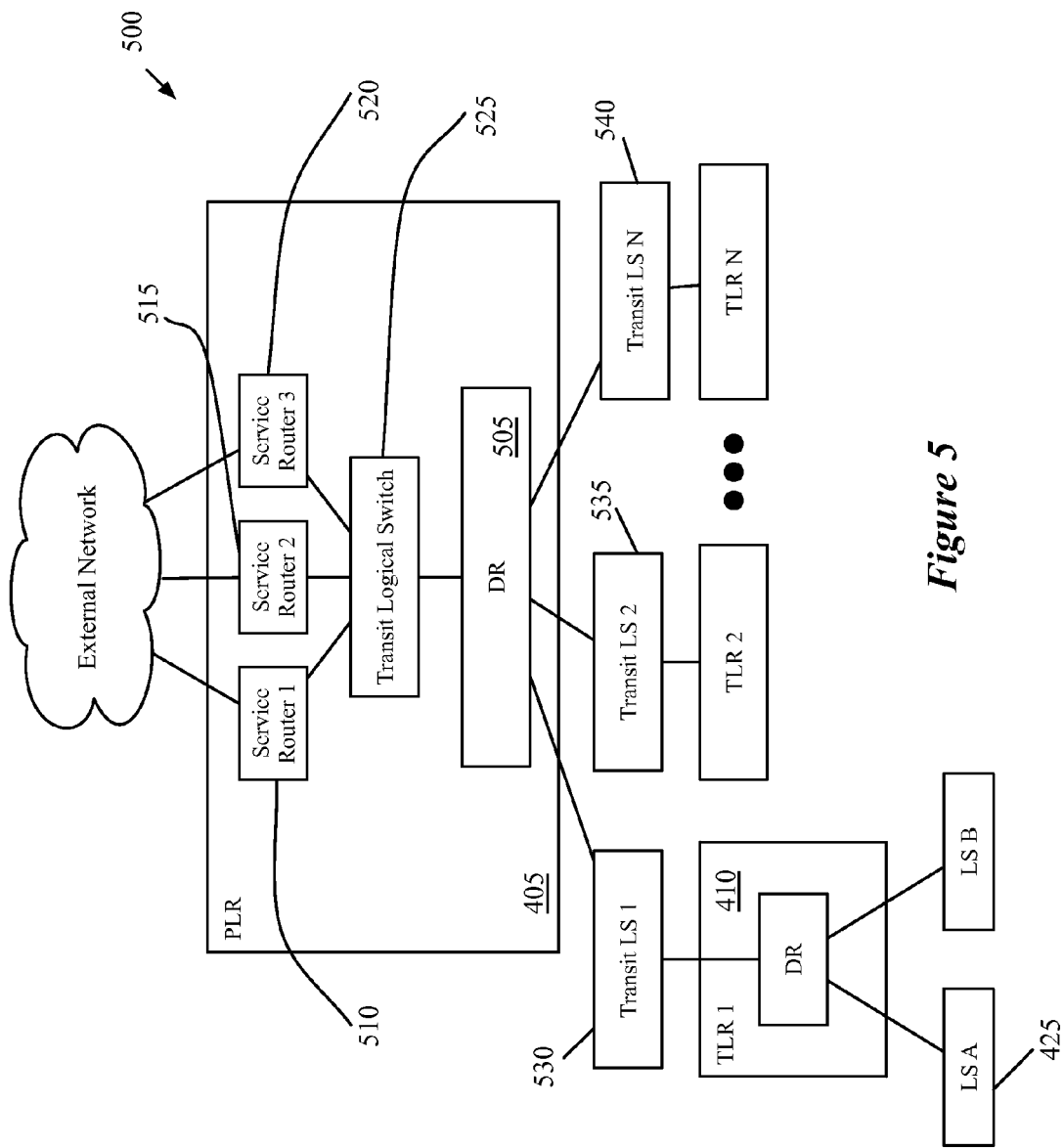
FIG. 5 illustrates the management plane view for the logical topology of FIG. 4 when a TLR in the logical network is completely distributed.
Figure 6:
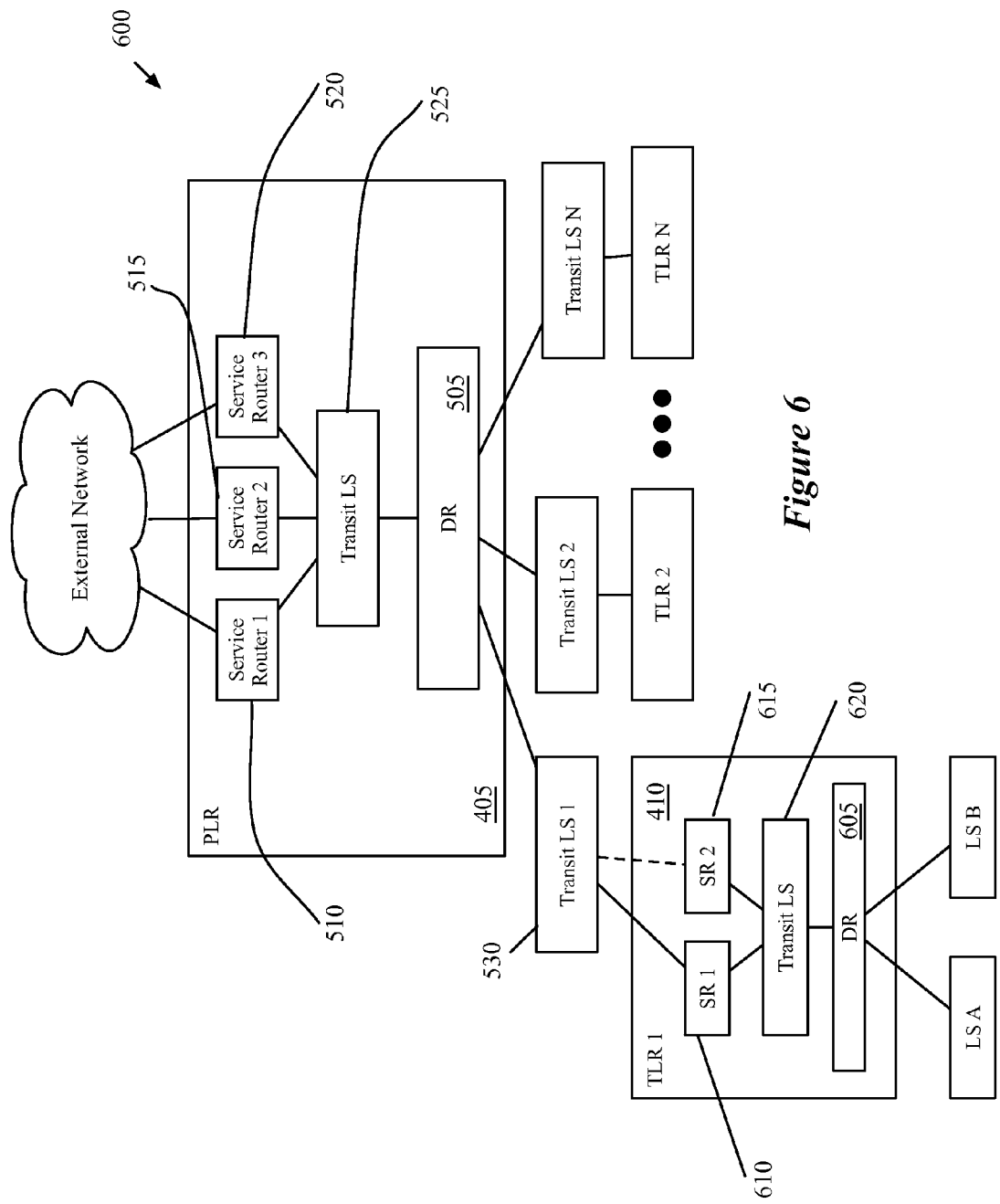
FIG. 6 illustrates the management plane view for the logical topology of FIG. 4 when the TLR in the logical network has a centralized component.

FIGS. 5 and 6 illustrate different possible management plane views of the logical network 400, depending on whether or not the TLR 405 includes a centralized component. In these examples, the routing aspects of the TLR 405 are always distributed using a DR. However, if the configuration of the TLR 405 includes the provision of stateful services, then the management plane view of the TLR (and thus the physical implementation) will include active and standby SRs for these stateful services.

Thus, FIG. 5 illustrates the management plane view 500 for the logical topology 400 when the TLR 405 is completely distributed. For simplicity, only details of the first TLR 410 are shown; the other TLRs will each have their own DR, as well as SRs in some cases. As in FIG. 2, the PLR 405 includes a DR 505 and three SRs 510-520, connected together by a transit logical switch 525. In addition to the transit logical switch 525 within the PLR 405 implementation, the management plane also defines separate transit logical switches 530-540 between each of the TLRs and the DR 505 of the PLR. In the case in which the TLR 410 is completely distributed (FIG. 5), the transit logical switch 530 connects to a DR 545 that implements the configuration of the TLR 410. Thus, as explained in greater detail in U.S. Provisional Application 62/110,061, filed Jan. 30, 2015, which is incorporated herein by reference, a packet sent to a destination in the external network by a data compute node attached to the logical switch 425 will be processed through the pipelines of the logical switch 425, the DR 545 of TLR 410, the transit logical switch 530, the DR 505 of the PLR 405, the transit logical switch 525, and one of the SRs 510-520. In some embodiments, all of the In some embodiments, the existence and definition of the transit logical switches 525 and 530-540 are hidden from the user that configures the network through the API (e.g., an administrator), with the possible exception of troubleshooting purposes.

FIG. 6 illustrates the management plane view 600 for the logical topology 400 when the TLR 405 has a centralized component (e.g., because stateful services that cannot be distributed are defined for the TLR). In some embodiments, stateful services such as firewalls, NAT, load balancing, etc. are only provided in a centralized manner. Other embodiments allow for some or all of such services to be distributed, however. As with the previous figure, only details of the first TLR 410 are shown for simplicity; the other TLRs may have the same defined components (DR, transit LS, and two SRs) or have only a DR as in the example of FIG. 5. The PLR 405 is implemented in the same manner as in the previous figure, with the DR 505 and the three SRs 510, connected to each other by the transit logical switch 525. In addition, as in the previous example, the management plane places the transit logical switches 530-540 between the PLR and each of the TLRs.

The partially centralized implementation of the TLR 410 includes a DR 605 to which the logical switches 425 and 430 attach, as well as two SRs 610 and 615. As in the PLR implementation, the DR and the two SRs each have interfaces to a transit logical switch 620. This transit logical switch serves the same purposes as the switch 525, in some embodiments. For TLRs, some embodiments implement the SRs in active-standby manner, with one of the SRs designated as active and the other designated as standby. Thus, so long as the active SR is operational, packets sent by a data compute node attached to one of the logical switches 425 and 430 will be sent to the active SR rather than the standby SR. In some embodiments, the transit logical switch 530 only includes a single port to connect to the TLR 410, and this port connects to the first SR 610, unless the SR fails and the connection moves to the second SR 615. As such, this connection is shown as a dashed line in the figure.

The above figures illustrate the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as the TLR 405 as implemented in FIG. 5, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 400), each of which may have its own transit logical switch. That is, in FIG. 6, transit logical switch 525 within the PLR implementation, transit logical switches 530-540 between the PLR and the TLRs, and transit logical switch 620 (as well as the transit logical switch within the implementation of any of the other TLRs) each require a unique subnet. Furthermore, in some embodiments, the SR may need to initiate a connection to a VM in logical space, e.g. HA proxy. To ensure that return traffic works, some embodiments avoid using link local IP addresses.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

II. SR and DR Configuration

When a user configures a logical router (e.g., by configuring its interfaces and provisioning routes), this configuration is used by the management plane to configure the SRs and DR for the logical router. For instance, the logical router 115 of FIG. 1 has four interfaces (two to the logical switches, and two uplinks). However, its distributed management plane implementation in FIG. 2 includes a DR with three interfaces and SRs with two interfaces each (a total of seven interfaces). The IP and MAC addresses and other configuration details assigned to the four interfaces as part of the logical router configuration are used to generate the configuration for the various components of the logical router.

In addition, as part of the configuration, some embodiments generate a routing information base (RIB) for each of the logical router components. That is, although the administrator defines only a single logical router, the management plane and/or control plane of some embodiments generates separate RIBs for the DR and for each of the SRs. For the SRs of a PLR, in some embodiments the management plane generates the RIB initially, but the physical implementation of the SR also runs a dynamic routing protocol process (e.g., BGP, OSPF, etc.) to supplement the RIB locally.

Some embodiments include several types of routes in the RIB of a logical routers, and therefore in the RIBs of its component routers. All routes, in some embodiments, include administrative distance values, used to determine priority, with larger values indicating lower priority types of route (i.e., if two routes exist for the same prefix, the one with a lower distance value is used). If multiple routes for the same prefix are in the RIB with the same distance value, traffic to these prefixes is spread across the different routes (e.g., using ECMP principles to balance the traffic evenly).

- connected (0): prefixes configured on the logical router's ports
- static (1): configured by the administrator/user
- management plane internal (10): default routes—when a TLR is connected to a PLR, a default route pointing to the PLR is added to the RIB of the TLR; when a logical switch is connected to a TLR, the user allows the subnet to be redistributed, and the subnet is not NAT'ed, a default route pointing to the TLR for the subnet is added to the RIB of the PLR
- EBGP (20): the next four types are routes learned through dynamic routing protocols
- OSPF internal (30)
- OSPF external (110)
- IBGP (200).

It should be understood that not all logical routers will include both BGP and OSPF routes in some embodiments, and some logical routers may include neither. For instance, a logical router that does not include a connection to external networks may not use any routing protocol, and some logical routers may run only one type of route-sharing protocol, rather than both BGP and OSPF.

In addition, in some embodiments, the SRs of the PLRs (that use the dynamic routing protocols) merge the RIB received from the centralized controllers (containing static, connected, and management plane internal routes) with the routes learned from the physical routers (via the dynamic routing protocols). The SR locally calculates its FIB based on the incorporation of these dynamic routes in order to expedite route convergence, rather than sending the learned routes back to the centralized controller for recalculation. For the DRs, the centralized controllers of some embodiments pushes down the entire RIB, with a local control plane calculating the FIB.

A. DR Configuration

In some embodiments, the DR is always located on the southbound side (i.e., facing the data compute nodes of the logical network, rather than facing the external physical network) of the logical router implementation. Unless the logical router has no centralized component, the uplinks of the logical router will not be configured for the DR, whose northbound interfaces instead couple to the transit logical switch that is part of the logical router.

Figure 7:
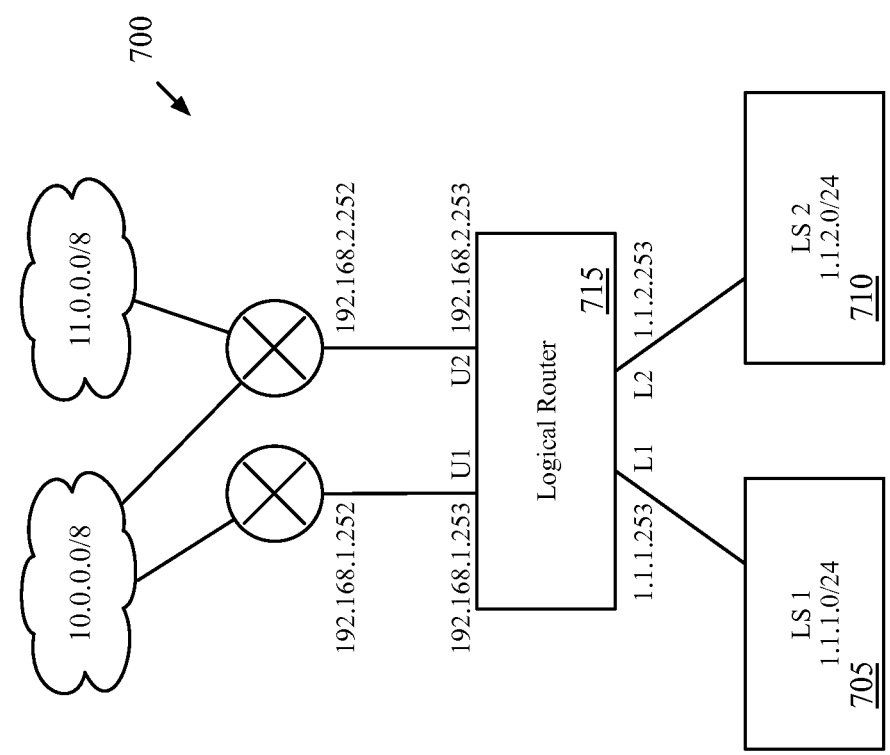
FIG. 7 conceptually illustrates a more detailed configuration of a logical network topology, including the network addresses and interfaces assigned by an administrator.

FIG. 7 conceptually illustrates the more detailed configuration of a logical network topology 700, including the network addresses and interfaces assigned by an administrator. As shown, the logical switches 705 and 710 are each assigned their own subnets, 1.1.1.0/24 and 1.1.2.0/24, and all of the data compute nodes attached to the logical switches 705 will have IP addresses in the corresponding subnet. The logical router 715 has an interface L1 to the first logical switch 705, with an IP address of 1.1.1.253 that is the default gateway for the data compute nodes in the subnet 1.1.1.0/24. The logical router 715 also has a second interface L2 to the second logical switch 710, with an IP address of 1.1.2.253 that is the default gateway for the data compute nodes in the subnet 1.1.2.0/24.

The northbound side of the logical router 715 has two uplinks, U1 and U2. The first uplink U1 has an IP address of 192.168.1.252 and connects to a first physical router 720 with an IP address of 192.168.1.252. The second uplink U2 has an IP address of 192.168.2.253 and connects to a second physical router 725 with an IP address of 192.168.2.252. The physical routers 720 and 725 are not actually part of the logical network, but rather connect the logical network to the external network. Though in the illustrated case each of the uplinks connects to a single, different physical router, in some cases each of the uplinks will connect to the same set of several physical routers. That is, both U1 and U2 might both connect to both of the physical routers 720 and 725. Some embodiments require that each of the external routers to which the uplinks connect provide the same connectivity, although this is not the case in the illustrated example. Instead, the first physical router 720 connects to the subnet 10.0.0.0/8, while the second router 725 connects to both the subnet 10.0.0.0/8 and 11.0.0.0/8.

For a logical router with a distributed component, some embodiments configure the DR as follows. The southbound interfaces are configured in the same way as the southbound interfaces of the logical router. These interfaces are those that connect to a logical switch in the logical topology, or to a lower-level logical router (e.g., the southbound interfaces of a PLR may connect to TLRs). The DR of some embodiments is allocated a single northbound interface, which is assigned an IP address and a MAC address. Assuming the logical router has one or more SRs, the northbound interface of the DR connects to a transit logical switch.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces may be user-defined logical domains to which data compute nodes connect, or transit logical switches located between the DR of a PLR and any TLRs that connect to the PLR.

In addition, any static routes that egress from an uplink of the logical router are included in the RIB of the DR; however, these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR southbound interface]". Static routes that egress from a southbound interface of the logical router, on the other hand, are included in the RIB of the DR unmodified. In some embodiments, for each SR of the logical router, a default route of the type management plane internal is added to the RIB of the DR. Instead, in other embodiments, dynamic routes learned by a particular SR are added to the RIB, with the next-hop IP address modified to be the IP of the southbound interface of the particular SR. This is an alternative to the default route, because the management plane internal type would otherwise have a higher priority than the dynamic routes learned by the SR. However, for TLRs, the SRs do not run a dynamic routing protocol in some embodiments, so the default route with a next-hop IP address pointing to the interface of the active SR is used instead.

Figure 8:
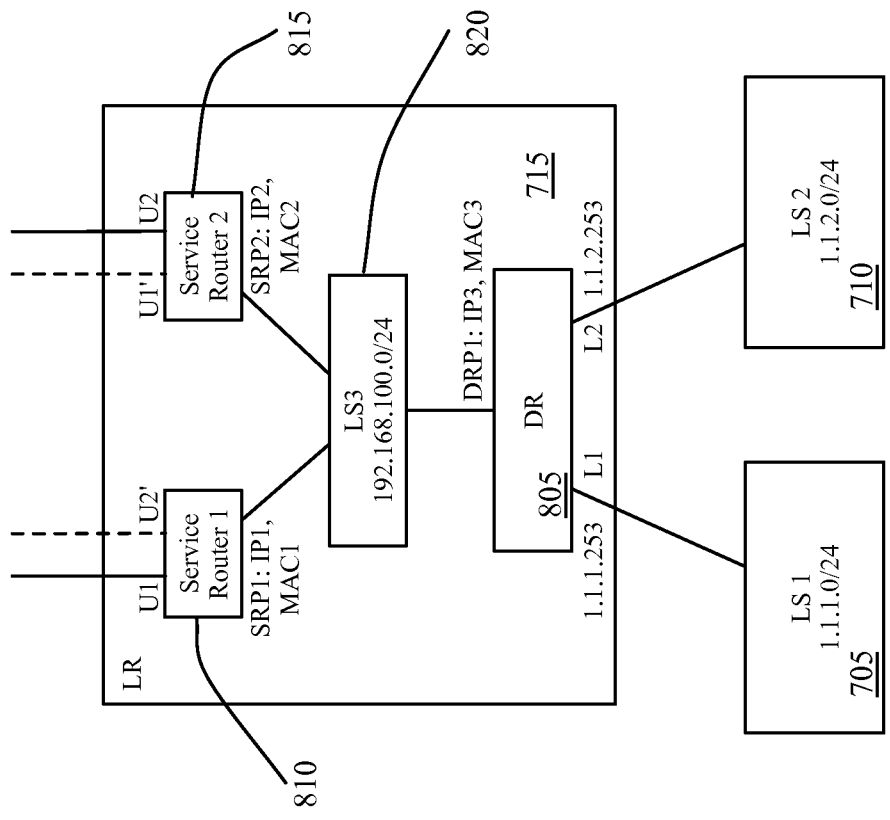
FIG. 8 illustrates the configuration of the logical topology of FIG. 7 by the management plane.

FIG. 8 illustrates the configuration 800 of the logical topology 700 by the management plane. As shown, the logical switches 705 and 710 are configured as indicated by the user configuration. As in the previous examples, the logical router 715 includes a DR 805, two SRs 810 and 815, and a transit logical switch 820. The DR is assigned the two southbound interfaces of the logical router 705, which connect to the logical switches 705 and 710. The transit logical switch is assigned a subnet of 192.168.100.0/24, which needs to satisfy the requirement that it be unique among the logical switches that logically connect (directly or indirectly) to the logical router 705. Each of the three management plane router constructs 805-815 also includes an interface that connects to the transit logical switch, and has an IP address in the subnet of the transit logical switch. The northbound interfaces U1 and U2 are assigned to the two SRs 810 and 815, the configuration of which is described below.

Using the rules of some embodiments described above for generating the RIB, the RIB of the DR 805 includes the following routes:

1.1.1.0/24 output to L1
1.1.2.0/24 output to L2
192.168.100.0/24 output to DRP1
192.168.1.0/24 via IP1
192.168.2.0/24 via IP2
10.0.0.0/8 via IP1
10.0.0.0/8 via IP2
11.0.0.0/8 via IP2
0.0.0.0/0 via IP1
0.0.0.0/0 via IP2

The above routes include three connected routes, for the logical switch domains connected to the DR (1.1.1.0/24, 1.1.2.0/24, and 192.168.100.0/24). In addition, the subnet on which the first uplink is located (192.168.1.0/24) is reached via the southbound interface of the first SR 810 (IP1), while the subnet on which the second uplink is located (192.168.2.0/24) is reached via the southbound interface of the second SR 815 (IP2). In addition, three static routes have been added by the user for the logical router 715, which the management plane automatically modifies for the DR 805. Specifically, the routes include the network 10.0.0.0/8 via the southbound interface of either of the SRs, and the network 11.0.0.0/8 via the southbound interface of SR2. Lastly, default routes pointing to these same southbound interfaces are included. The IP addresses IP1, IP2, and IP3 that are created by the management plane for the ports of the logical router constructs that interface with the transit logical switch all are in the subnet 192.168.100.0/24.

B. SR Configuration

As with the DR of a logical router, the management plane also configures each SR of the logical router with a separate RIB and interfaces. As described above, in some embodiments SRs of both PLRs and TLRs may deliver services (i.e., functionalities beyond simply routing, such as NAT, firewall, load balancing, etc.) and the SRs for PLRs also provide the connection between the logical network and external physical networks. In some embodiments, the implementation of the SRs is designed to meet several goals. First, the implementation ensures that the services can scale out—that is, the services assigned to a logical router may be delivered by any of the several SRs of the logical router. Second, some embodiments configure the SR in such a way that the service policies may depend on routing decisions (e.g., interface-based NAT). Third, the SRs of a logical router have the ability to handle failure (e.g., of the physical machine on which an SR operates, of the tunnels to that physical machine, etc.) among themselves without requiring the involvement of a centralized control plane or management plane (though some embodiments allow the SRs to operate at reduced capacity or in a suboptimal manner). Finally, the SRs ideally avoid unnecessary redirecting amongst themselves. That is, an SR should forward packets to the external physical network if it has the ability do so locally, only forwarding the packet to a different SR if necessary. Of course, the forwarding between SRs should avoid packet loops.

As shown in FIG. 8, each SR has one southbound interface that connects to the transit logical switch 820 that resides between the SRs and the DR. In addition, in some embodiments, each SR has the same number of northbound interfaces as the logical router. That is, even though only one uplink may be assigned to the physical machine on which the SR operates, all of the logical router interfaces are defined on the SR. However, some of these interfaces are local interfaces while some of them are referred to as dummy interfaces.

The local northbound interfaces, in some embodiments, are those through which a packet can egress directly from the SR (e.g., directly to the physical network). An interface configured based on the uplink (or one of the uplinks) assigned to the SR is a local interface. On the other hand, an interface configured based on one of the other uplinks of the logical router assigned to a different SR is referred to as a dummy interface. Providing the SR with configuration for the dummy interfaces allows for the first-hop MFEs to send packets for any of the uplinks to any of the SRs, with that SR able to process the packets even if the packet is not destined for its local interface. Some embodiments, after processing a packet at one of the SRs for a dummy interface, forward the packet to the appropriate SR where that interface is local, in order for the other SR to forward the packet out to the external physical network. The use of dummy interfaces also allows the centralized controller (or set of controllers) that manages the network to push service policies that depend on routing decisions to all of the SRs, thereby allowing services to be delivered by any of the SRs.

As discussed below in Section IV, in some embodiments the SRs exchange routing information with the physical network (e.g., using a route advertisement protocol such as BGP or OSPF). One goal of this route exchange is that irrespective of which SR routes a packet towards the physical network, the routing decision should always point to either a local interface of the SR or a dummy interface that corresponds to an uplink of the logical router on a different SR. Thus, the policies associated with the logical router uplink can be applied by the SR even when the uplink is not assigned to that SR, enabling the scale out of stateful services. In some embodiments, the routes received from a peer SR will have a larger distance value than routes learned directly from a physical next-hop router, thereby ensuring that a SR will send a packet to its peer SR only when it cannot send the packet directly to a physical network router.

For a logical router that has one or more centralized components, some embodiments configure the SR as follows. For northbound interfaces, the SR has the same number of such interfaces as the logical router, and these interfaces each inherit the IP and MAC address of the corresponding logical router interfaces. A subset of these interfaces are marked as local interfaces (those for which the uplink is assigned to the SR), while the rest of the interfaces are marked as dummy interfaces. In some embodiments, the service policies defined for the logical router are pushed equivalently to all of the SRs, as these are configured in the same way from the network and interface perspective. The dynamic routing configuration for a particular logical router port/uplink are transferred to the local interface of the SR to which that particular uplink is assigned.

Each SR, as mentioned, is assigned a single southbound interface (also a local interface) that connects to a transit logical switch, with each SR's southbound interface connecting to the same transit logical switch. The IP addresses for each of these southbound interfaces is in the same subnet as the northbound interface assigned to the DR (that of the transit logical switch). Some embodiments differentiate the assignment of IP addresses between the SRs depending on whether the SRs are in active-active or active-standby mode. For active-active mode (i.e., when all of the SRs are treated as equals for routing purposes), different IP and MAC addresses are assigned to the southbound interfaces of all of the SRs. On the other hand, in active-standby mode, the same IP is used for both of the southbound interfaces of the two SRs, while each of the interfaces is assigned a different MAC address.

As indicated in the above subsection regarding DRs, users may configure static routes for the logical router. A static route (or a connected route) of the logical router that egresses from an uplink is copied to the RIB of the SR. The distance metric for such a route is unmodified if the uplink through which the route egresses is assigned to the SR; however, if the uplink is a dummy interface on the SR, then some embodiments add a value to this metric so that the SR will prefer a route that egresses from its local interface when the network can be reached without redirecting the packet to a different SR through a dummy interface. In addition, the SRs (of a top-level logical router) may learn dynamic routes and place these in their RIB (though some embodiments perform this locally, without involving the centralized controllers). In some embodiments, the dynamic routes learned from peer SRs are installed without this adjustment of the distance metric, because by default the metric for routes learned from IBGP (SR to SR peering) or OSPF are larger than the metric for routes learned from EBGP.

For each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address.

Returning to the example of FIG. 8, as the logical router 715 has two uplinks, the management plane defines two service routers 810 and 815. The first service router 810 has a local interface for U1 and a dummy interface for U2, referred to as U2'. Similarly, the second service router 815 has a local interface for U2 and a dummy interface, U1', for the first uplink U1. The function of these dummy interfaces is described above, as these interfaces are used to redirect packets to the other SR. Each of these SRs is assigned a southbound interface, with different IP and MAC addresses (as the SRs are in an active-active configuration). The IP addresses IP1 (for the first SR 810) and IP2 (for the second SR 815) are in the subnet 192.1.100.0/24, as is IP3 (the northbound interface of the DR 805).

Using the rules of some embodiments, and assuming the a routing protocol (e.g., BGP) is enabled for the SRs, the RIB of the first SR 810 will include the following routes:
    10.0.0.0/8 output to U1 via 192.168.1.252, metric 20 (via EBGP)
    10.0.0.0/8 output to U2' via 192.168.2.252, metric 200 (via IBGP)
    11.0.0.0/8 output to U2' via 192.168.2.252, metric 200 (via IBGP)
    192.168.1.0/24 output to U1, metric 0 (connected)
    192.168.100.0/24 output to SRP1, metric 0 (connected)
    1.1.1.0/24 via IP3, metric 10 (management plane internal)
    1.1.2.0/24 via IP3, metric 10 (management plane internal)
Similarly, the RIB of the second SR 815 will include the following routes:
    10.0.0.0/8 output to U2 via 192.168.2.252, metric 20 (via EBGP)
    10.0.0.0/8 output to U1' via 192.168.1.252, metric 200 (via IBGP)
    11.0.0.0/8 output to U2 via 192.168.2.252, metric 20 (via EBGP)
    192.168.2.0/24 output to U2, metric 0 (connected)
    192.168.100.0/24 output to SRP2, metric 0 (connected)
    1.1.1.0/24 via IP3, metric 10 (management plane internal)
    1.1.2.0/24 via IP3, metric 10 (management plane internal)

C. Management Plane Processes

Figure 9:
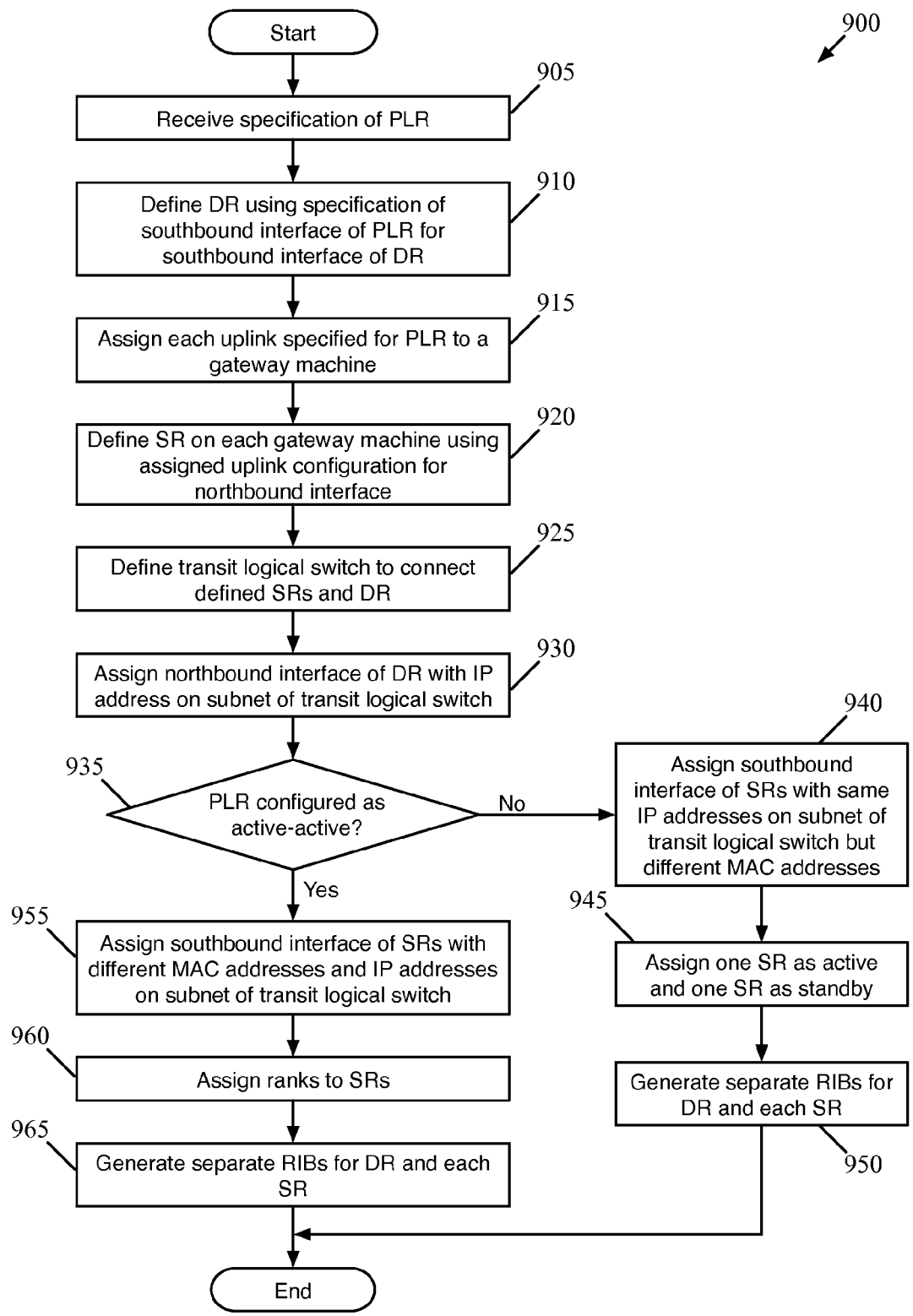
FIG. 9 conceptually illustrates a process of some embodiments for configuring a PLR based on a user specification.

FIG. 9 conceptually illustrates a process 900 of some embodiments for configuring a PLR based on a user specification. In some embodiments, the process 900 is performed by the management plane (e.g., a set of modules at a centralized controller that manages the networks of a datacenter). The management plane performs the configuration process, then uses a centralized control plane of the controller (or of a different network controller) to distribute the data to various local control planes on the various host machines that implement the configured logical router.

As shown, the process 900 begins by receiving (at 905) a specification of a PLR. The specification of a PLR is based on administrator input to define the PLR (e.g., an administrator employed by the owner of the datacenter). In some embodiments, this specification includes definitions of any services the PLR should provide, whether the PLR will be configured in active-active or active-standby mode (though some embodiments automatically use active-active mode unless stateful services are configured), how many uplinks are configured for the PLR, the IP and MAC addresses of the uplinks, the L2 and L3 connectivity of the uplinks, the subnets of any southbound interfaces of the PLR (one interface if the PLR is intended for a two-tier topology, and any number of interfaces if user logical switches will connect directly in a single-tier topology), any static routes for the RIB of the PLR, as well as other data. It should be understood that different embodiments may include different combinations of the listed data or other data in the configuration data for a PLR.

The process 900 then defines (at 910) a DR using this configuration data. This assumes that the PLR will not be completely centralized, in which case no DR is generated by the management plane. For the southbound interface of the DR, the management plane uses the southbound interface configuration of the PLR. That is, the IP address and MAC address for the DR are those specified for the logical router.

In addition, the process assigns (at 915) each uplink specified for the PLR to a gateway machine. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns each of the uplinks to one of the gateway machines in the selected set. Some embodiments allow multiple uplinks to be assigned to the same gateway machine (so long as the logical router does not have only two uplinks configured in active-standby mode), while other embodiments only allow a single uplink per gateway machine for the PLR irrespective of whether in active-active or active-standby.

After assigning the uplinks to gateway machines, the process 900 defines (at 920) a SR on each of the selected gateway machines. For each SR, the process uses the configuration for the uplink assigned to that gateway machine as the configuration for the northbound interface of the SR. This configuration information includes the IP and MAC address of the uplink, as well as any uplink-specific policies. It should be understood that, for situations in which different policies and/or L3 connectivity are allowed and used between the different uplinks, some embodiments also configure dummy interfaces on the SRs in order to redirect packets if needed.

The process additionally defines (at 925) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the transit logical switch must use a subnet different from any user-defined logical switches that interface directly with the PLR, as well as all transit logical switches between the PLR and any TLRs that connect to the PLR, all transit logical switches within these TLRs, and any user-defined logical switches that connect to these TLRs.

Next, the process 900 assigns (at 930) a northbound interface to the DR. The northbound interface, in some embodiments, is assigned both a MAC address and an IP address (used for packets sent internally between the components of the PLR). In some embodiments, the IP address is in the subnet that was assigned to the transit logical switch defined at 925. The configuration of the transit logical switch includes an association of this MAC address with one of its logical ports.

The process then determines (at 935) whether the PLR is configured in active-active mode (or active-standby mode). As noted above, in some embodiments, this determination is made by the administrator as part of the configuration settings for the PLR. In other embodiments, the management plane automatically defines the SRs in active-active configuration for PLRs unless stateful services are set up, in which case the SRs are defined in active-standby mode.

When the PLR is configured in active-standby mode, the process assigns (at 940) southbound interfaces of each of the two SRs (or more than two SRs, if there are multiple standbys). In the active-standby case, these southbound interfaces all have the same IP address, which is in the subnet of the transit logical switch defined at operation 925. Although the two interfaces receive the same IP address, the MAC addresses assigned are different, so as to differentiate the two as destinations for northbound packets routed by the DR.

The process then assigns (at 945) one of the SRs as active and one of the SRs as standby. Some embodiments make this determination randomly, while other embodiments attempt to balance the assignment of active and standby SRs across the gateway machines, as described in greater detail in U.S. Patent Publication 2015/0063364, which is incorporated herein by reference. The SR assigned as active will respond to ARP requests for the southbound interface, and will advertise prefixes to the external physical network from its northbound interface. The standby SR, on the other hand, will not respond to ARP requests (so as to avoid receiving northbound traffic), and will not advertise prefixes (but will maintain a BGP session in order to receive routes from the external network in case of failure of the active SR.

Lastly, the process 900 generates (at 950) separate RIBs for the DR and for each of the SRs. The separate RIBs are generated based on the configuration data in the manner described in the previous subsections, as well as below in Section V. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers. The calculation of the FIB by network controllers of some embodiments is described in greater detail in U.S. patent application Ser. No. 14/214,545, filed Mar. 14, 2014, now issued as U.S. Pat. No. 9,313,129, which is incorporated herein by reference.

On the other hand, when the PLR is configured in active-active (ECMP) mode, the process assigns (at 955) southbound interfaces of each of the SRs. In the active-active cases, these southbound interfaces are each assigned different IP addresses in the subnet of the transit logical switch defined at operation 925, as well as different MAC addresses. With different IP addresses, each of the SRs can handle northbound packets based on the IP address selected for a given packet by the DR pipeline in a host machine.

Next, the process assigns (at 960) ranks to the SRs. As described in detail below, the SRs use the ranks in case of failover to determine which SR will take over responsibilities for a failed SR. In some embodiments, the next-highest ranked SR takes over for a failed SR by taking over its southbound interfaces so as to attract northbound traffic that would otherwise be sent to the IP address of the failed SR.

Finally, the process generates (at 965) separate RIBs for the DR and for each of the SRs. The separate RIBs are generated based on the configuration data in the manner described in the previous subsections, as well as below in Section IV. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Figure 10:
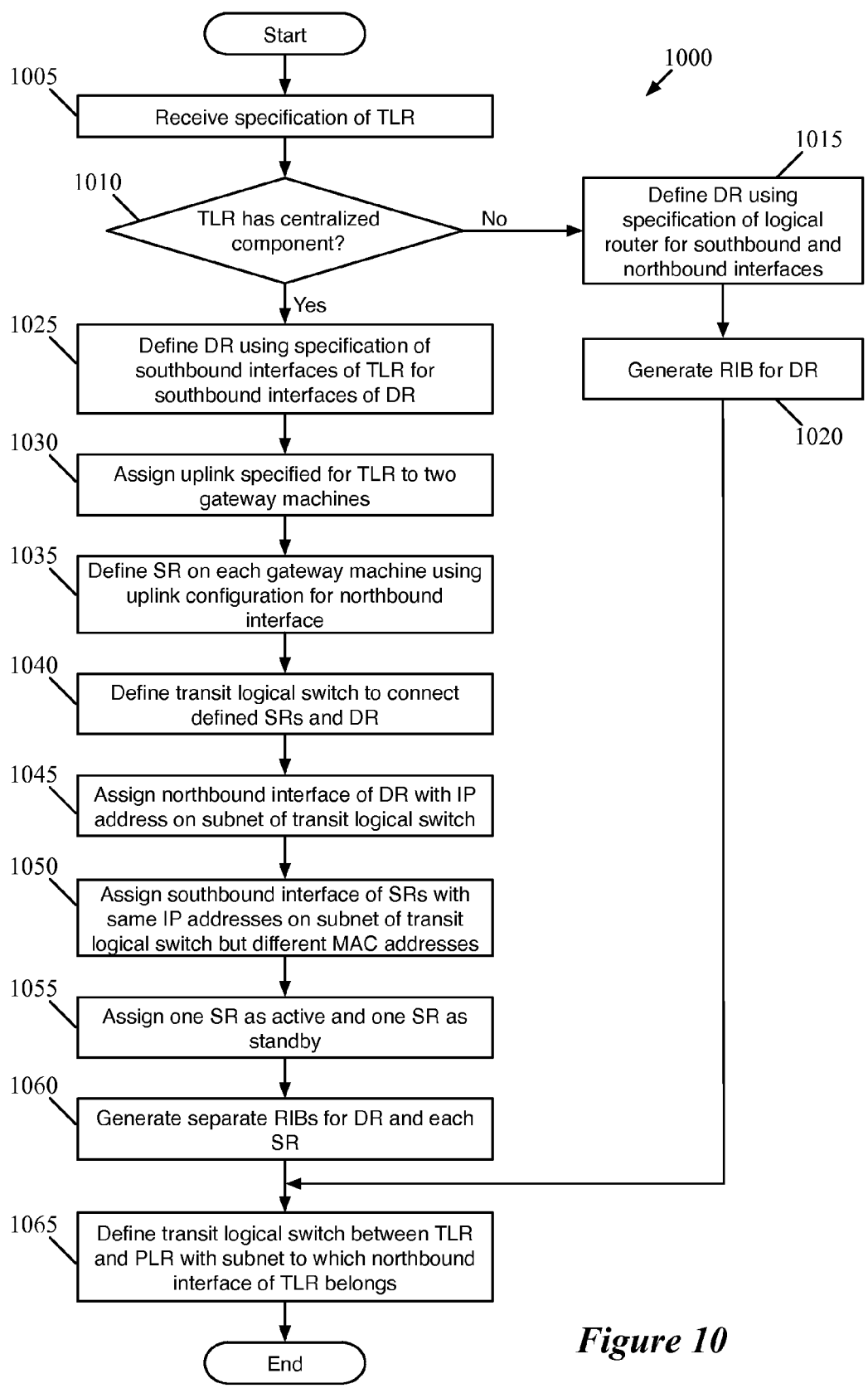
FIG. 10 conceptually illustrates a process of some embodiments for configuring a TLR based on a user specification.

The above description of FIG. 9 indicates the operations of the management plane to generate the various components for a PLR (upper tier logical router). FIG. 10 conceptually illustrates a process 1000 of some embodiments for configuring a TLR based on a user specification. In some embodiments, the process 1000 is performed by the management plane (e.g., a set of modules at a centralized controller that manages the networks of a datacenter). The management plane performs the configuration process, then uses a centralized control plane of the controller (or a different network controller) to distribute the data to various local control planes on the various host machines that implement the configured logical router.

As shown, the process begins by receiving (at 1005) a specification of a TLR. The specification of a TLR is based on administrator input to define the TLR (e.g., an administrator employed by a tenant of the datacenter). In some embodiments, this specification includes definitions of any services the TLR should provide, which PLR the TLR should connect to through its uplink, any logical switches that connect to the TLR, IP and MAC addresses for the interfaces of the TLR, any static routes for the RIB of the TLR, as well as other data. It should be understood that different embodiments may include different combinations of the listed data or other data in the configuration data for the TLR.

The process 1000 then determines (at 1010) whether the TLR has a centralized component. In some embodiments, if the TLR does not provide stateful services, then no SRs are defined for the TLR, and it is implemented only in a distributed manner. On the other hand, some embodiments require SRs in active-standby mode when stateful services are provided, as shown in this figure.

When the TLR does not provide stateful services or otherwise require a centralized component, the process defines (at 1015) a DR using the specification of the logical router for both the southbound and northbound interfaces. The DR may have numerous southbound interfaces, depending on how many logical switches are defined to connect to the TLR. On the other hand, some embodiments restrict TLRs to a single northbound interface that sends packets to and receives packets from a PLR. The process also generates (at 1020) a RIB for the DR. The RIB for the DR will include all of the routes for the logical router, generated as described above.

On the other hand, when the TLR provides stateful services or requires a centralized component for other reasons, the process defines (at 1025) a DR using the received configuration data. For the southbound interfaces of the DR, the management plane uses the southbound interface configurations of the TLR. That is, the IP address and MAC address for each southbound interface are those specified for the ports of the logical router to which the various logical switches couple.

In addition, the process assigns (at 1030) the uplink specified for the TLR to two gateway machines. While some embodiments allow TLRs to operate in active-active mode with multiple uplinks, the process 1000 is for embodiments that restrict the TLRs to a single uplink (also referred to as a router link, as the link interconnects the TLR to another logical router) in active-standby mode. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns the uplink to two of the gateway machines in the selected set.

After assigning the uplinks to gateway machines, the process 1000 defines (at 1035) a SR on each of the two gateway machines. For each SR, the management plane uses the configuration for the single uplink as the configuration for the northbound interface of the SR. As there is only one northbound interface, the process applies the same configuration to both of the SRs. That is, not only is the same IP address used for both northbound interfaces, but the services on the interfaces are configured in the same manner as well. However, different MAC addresses are used for the northbound interfaces, so as to differentiate the active and standby SRs.

The process additionally defines (at 1040) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the management plane must assign the transit logical switch a subnet different than any of the user-defined logical switches that interface with the TLR, as well as any transit logical switches between the TLR (or other TLRs) and the PLR, as well as all transit logical switches within other TLRs that connect to the same PLR, the transit logical switch within the PLR, and the user-defined logical switches that connect to the other TLRs.

Next, the process assigns (at 1045) a northbound interface to the DR. This interface, in some embodiments, is assigned both a MAC address and an IP address (used for packets sent internally between the components of the TLR). In some embodiments, the IP address is in the same subnet that was assigned to the transit logical switch at 940. The process also assigns (at 1050) southbound interfaces of each of the two SRs. As this is an active-standby configuration, these southbound interfaces have the same IP address, which is in the subnet of the transit logical switch defined at operation 940. Although the two interfaces receive the same IP address, the MAC addresses assigned are different, so as to differentiate the two as destinations for northbound packets routed by the DR.

The process 1000 then assigns (at 1055) one of the SRs as active and one of the SRs as standby. Some embodiments make this determination randomly, while other embodiments attempt to balance the assignment of active and standby SRs across the gateway machines. The SR assigned as active will respond to ARP requests for the southbound (from the DR of this TLR) and northbound (from the DR of the PLR) interfaces. The standby SR, on the other hand, will not respond to ARP requests (so as to avoid receiving northbound or southbound traffic).

Next, the process generates (at 1060) separate RIBs for the DR and for each of the SRs. The separate RIBs are generated based on the configuration data in the manner described in the previous subsections, as well as below in Section IV. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Irrespective of whether the TLR is generated with or without SRs, the process 1000 defines (at 1065) another transit logical between the TLR and the PLR to which it connects. This transit logical switch has a unique VNI, and a subnet to which the uplink IP address of the TLR belongs. In addition, an interface on the DR of the PLR is created in the same subnet to connect to the transit logical switch. The process then ends.

It should be understood that while the processes 900 and 1000 illustrate a specific order for performing these various operations, these processes are merely conceptual. In various different embodiments, the management plane may perform the actual operations in various different orders, or even perform some of the operations in parallel. For instance, the management plane could define the transit logical switch first, prior to defining the SR or DR at all, could define all of the logical router components completely before assigning them to separate physical machines, etc.

III. Route Advertisement by TLR

As mentioned, some embodiments provide management plane processes for handling route advertisement by TLRs at the PLR level. In some embodiments, the management plane receives configuration data indicating that a TLR has a particular set of network addresses (e.g., a network address prefix) set for route advertisement (e.g., based on configuration data input for the owner of the TLR). In addition, the management plane has configuration data for the PLR to which the TLR connects that specifies allowable network addresses (e.g., network address prefixes) for routes that may be added to the routing table of the PLR based on route advertisement by a TLR. In some embodiments, the set of allowable routes specifies allowable network addresses for each logical port (or interface) of the PLR, such that a route advertised by a particular TLR is only allowed if the route is for a set of network address that are specified as allowable for the particular logical interface of the PLR to which the particular TLR connects.

Figure 11:
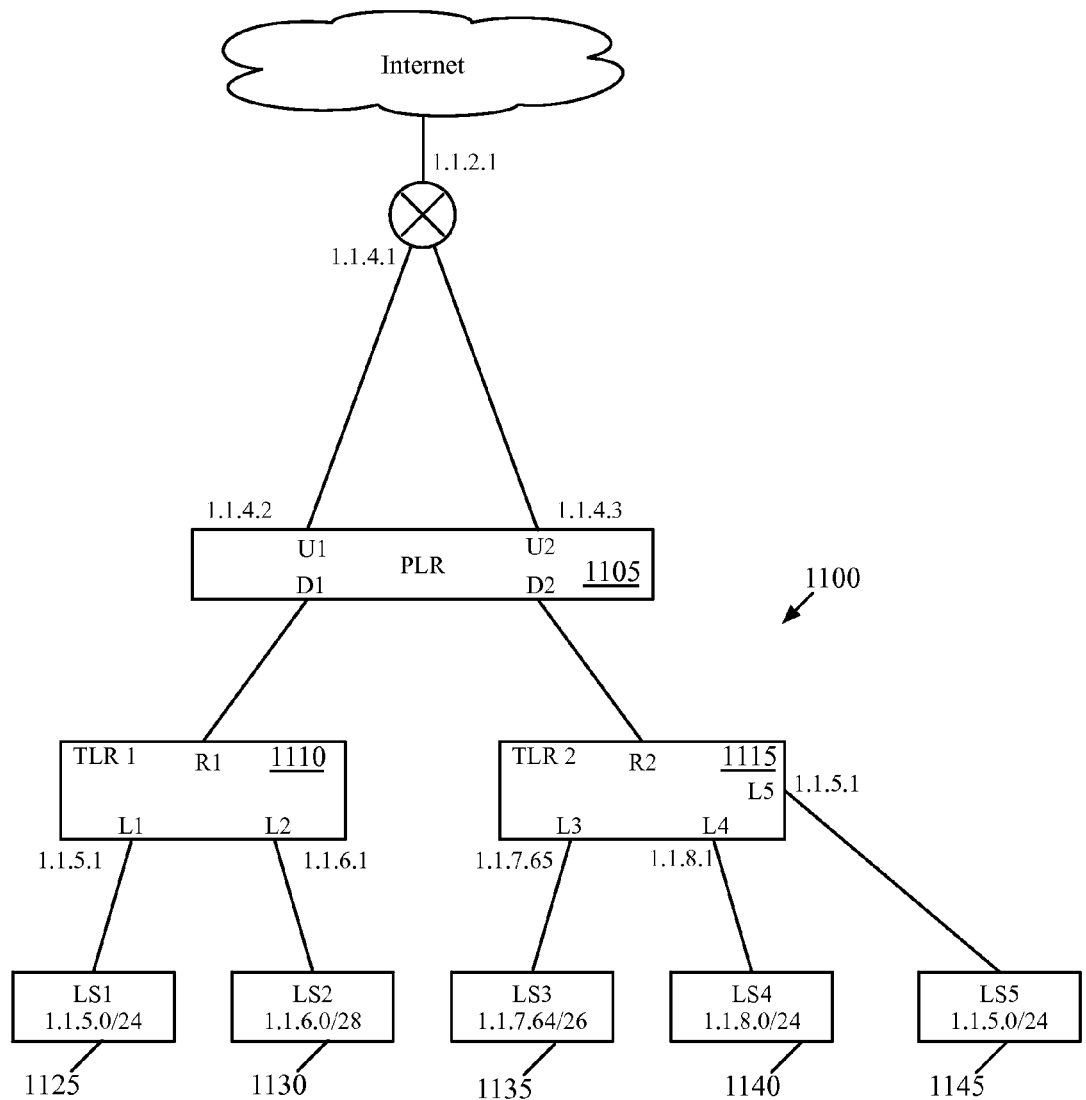
FIG. 11 conceptually illustrates a complex logical network configuration used to illustrate the route advertisement rules of some embodiments.

FIG. 11 conceptually illustrates a more complex logical network configuration that will be used to illustrate the route advertisement rules of some embodiments. Specifically, the logical network configuration 1100 includes a PLR 1105 to which two TLRs 1110 and 1115 logically attach. The first TLR 1110 has two logical switches 1125 and 1130 attached, and the second TLR 1115 has three logical switches 1135, 1140, and 1145 attached. The PLR 1105 is configured with two uplinks U1 and U2. U1 has an IP address of 1.1.4.2 and connects to an external physical router port 1.1.4.1 (on a subnet 1.1.4.0/28), while U2 has an IP address of 1.1.4.3, and connects to the same physical router port 1.1.4.1. The PLR also has two south-facing interfaces D1 and D2 that connect to the TLRs 1110 and 1115. In some embodiments, the user that attaches a TLR to a PLR (i.e., the owner of the TLR) does not configure this interface. Instead, as shown in the subsequent management plane view of FIG. 12, the management plane automatically configures a logical switch between the two logical routers and assigns a subnet to the logical switch.

In some embodiments, a datacenter administrator configures the PLR (i.e., the uplinks and their connectivity). A first tenant configures the first TLR 1110 as well as its two logical switches 1125 and 1130, while a second tenant independently configures the second TLR 1115, as well as its three logical switches 1135-1145. In other embodiments, a single administrator may configure the entire logical network 1100 (e.g., in the case of an enterprise network).

In this example, a first user configures the first TLR 1110 to have (i) a first interface with an IP address of 1.1.5.1 that connects to the logical switch 1125 (which has a subnet 1.1.5.0/24), (ii) a second interface with an IP address of 1.1.6.1 that connects to a second logical switch 1130 (which has a subnet of 1.1.6.0/24), and (iii) a third interface that connects to the PLR 1105. Similarly, a second user configures the second TLR 1115 to have (i) a first interface with an IP address of 1.1.7.65 that connects to the logical switch 1135 (which has a subnet 1.1.7.64/26), (ii) a second interface with an IP address of 1.1.8.1 that connects to the logical switch 1140 (which has a subnet 1.1.8.0/24), (iii) a third interface with an IP address of 1.1.5.1 that connects to the logical switch 1145 (which has a subnet 1.1.5.0/24).

When different users configure the different logical routers, some embodiments restrict the subnets available for the various logical switches 1120-1140 to ensure that if the IP addresses are made public (e.g., advertised to the external network via the uplinks U1 and U2), different subnets are used for each of the logical switches. Other embodiments (as in this example) allow logical switches attached to different TLRs to reuse subnets while placing restrictions on whether the subnets may be advertised externally (by only allowing the PLR to accept certain routes for advertisement).

Figure 12:
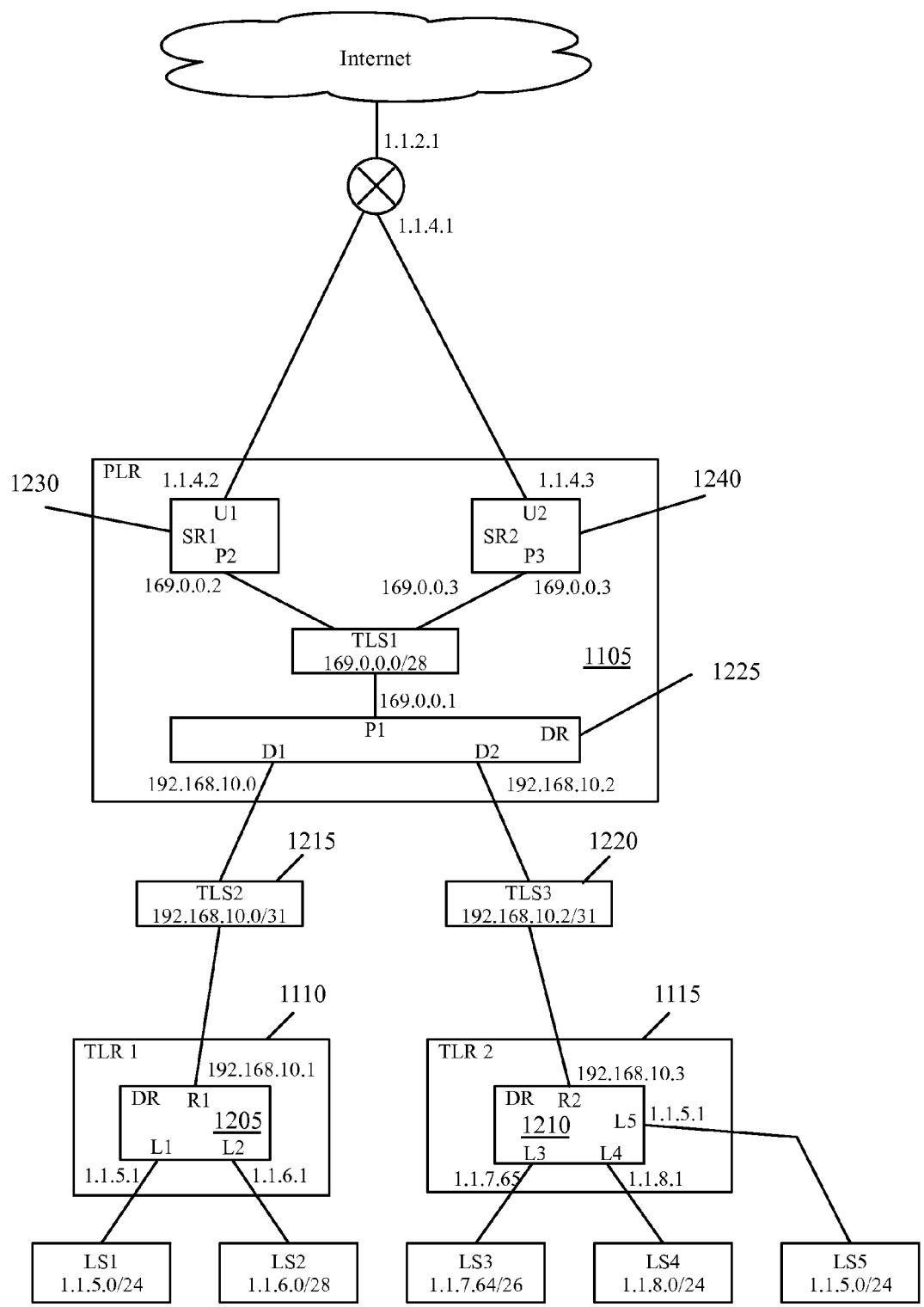
FIG. 12 conceptually illustrates the logical network as generated by the management plane based on the configuration shown in FIG. 11.

FIG. 12 conceptually illustrates the logical network 1100 as generated by the management plane based on the configuration shown in FIG. 11 (as input by a set of users through the API). In this case, neither of the TLRs 1110 and 1115 include stateful services, and therefore no SRs are required for the TLRs. As described in the previous sections, the TLRs 1110 and 1115 include DRs 1205 and 1210, respectively. The south-facing ports of the TLRs to which the logical switches connect are assigned the same IP addresses (in the subnet of their attached logical switch) as those given to the TLR in the logical network configuration 1100 (e.g., 1.1.5.1, 1.1.6.1, etc.). In addition, for each connection between a TLR and the PLR 1105, the management plane assigns a transit logical switch, and assigns north-facing interface IP addresses on the DRs 1205 and 1210 with IP addresses in the respective subnets of these logical switches. In some embodiments, because each of these transit logical switches will only need two addresses, the management plane always assigns /31 subnets from a pool of such subnets, so as to avoid wasting IP address space. In this case, the first transit logical switch 1215 has a subnet of 192.168.10.0/31, while the second transit logical switch 1220 has the next subnet 192.168.10.2/31.

The management plane also defines a DR 1225 and two SRs 1230 and 1240 (one for each uplink) for the PLR 1105. The DR 1225 has the two south-facing interfaces of the PLR 1105 (as described in the previous section, and with IP addresses on the subnets of their respective transit logical switches 1215 and 1220), in addition to a third interface P1 defined by the management plane. This interface P1 connects to a transit logical switch 1245 with a subnet of 169.0.0.0/28, to which south-facing interfaces of the two SRs 1230 and 1240 also connect. These three interfaces P1-P3 have, in turn, IP addresses of 169.0.0.1, 169.0.0.2, and 169.0.0.3.

Figure 13:
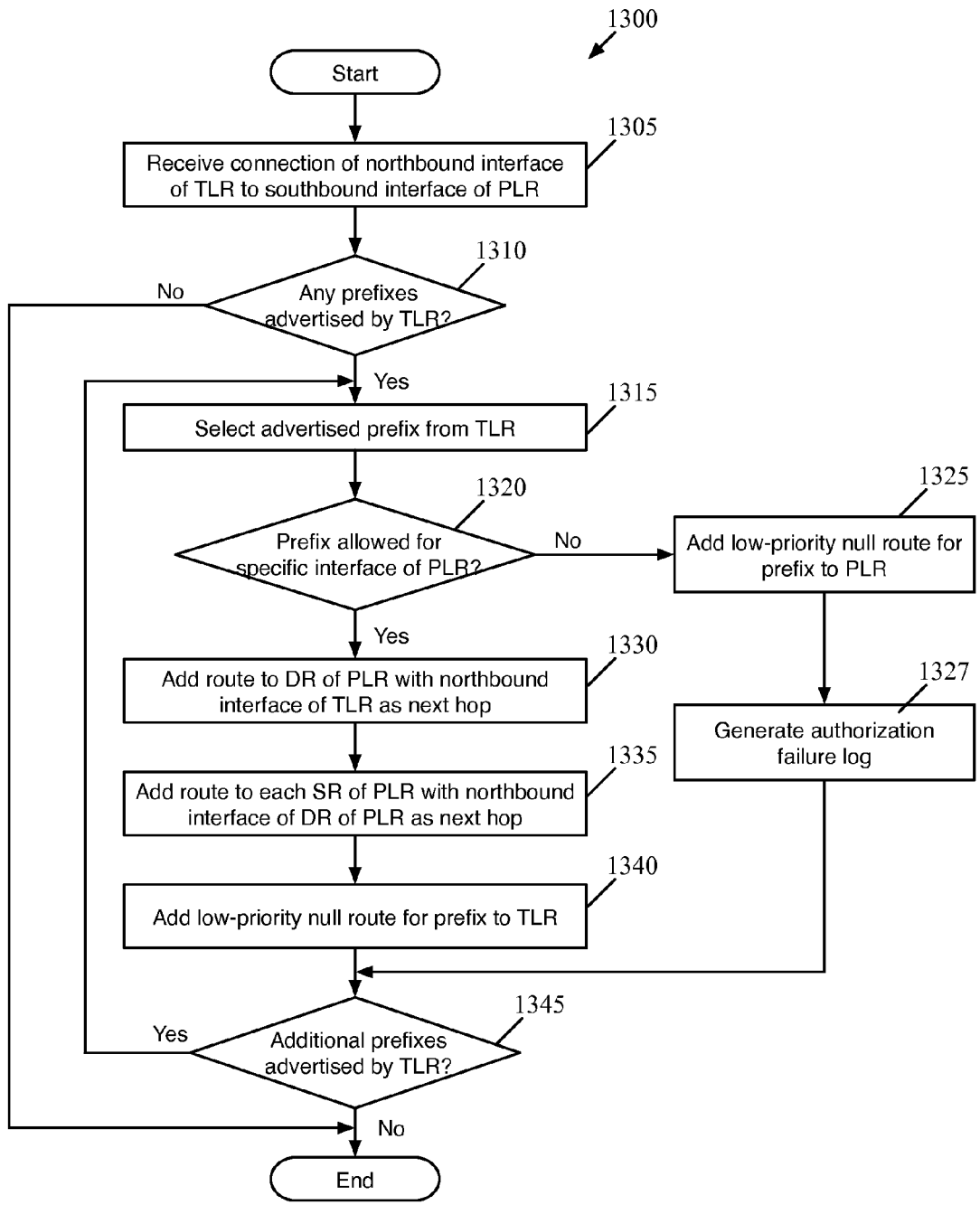
FIG. 13 conceptually illustrates a process of some embodiments for generating routes for the routing tables of the various routing components of TLRs and PLRs based on route advertisement by TLRs.

While the above figures illustrate the generation of the routing components by the management plane, they do not indicate the routing tables of these various components. In addition, part of the configuration of the routers includes specifications regarding which routes each TLR will advertise and which routes the PLR will allow for advertisement. FIG. 13 conceptually illustrates a process 1300 of some embodiments for generating routes for the routing tables of the various routing components of TLRs and PLRs based on route advertisement by TLRs. While explained here in terms of TLRs and PLRs, it should be understood that the principles regarding advertisement of routes by a lower tier logical router to a higher tier logical router may apply to any type of hierarchical structure of logical routers, including logical routers arranged across more than two tiers. The process 1300 of some embodiments is performed by a network controller or set of network controllers that manages one or more of the TLR and the PLR (i.e., by the management plane or central control plane that the network controller implements). In some embodiments, different operations of the process 1300 may be performed by different network controllers, if one of the controllers is a master controller for the PLR and another of the controllers is a master controller for the TLR. The process 1300 generates some of the routes in the routing tables of the PLR and TLR components; it should be understood that other routes will be generated by other processes performed by the network controllers. Once the routing tables are generated, this data is propagated to managed forwarding elements and gateways that implement the logical routers (e.g., through local controllers operating alongside the managed forwarding elements).

The process 1300 will be described by reference to FIG. 14, which illustrates configuration information 1405 received (e.g., through an API) and the management plane output 1400 for the routing tables 1410-1430 of the SRs and DRs of the PLR 1105 and TLRs 1110 and 1115. The configuration data includes a whitelist 1435 (i.e., a set of allowable routes (network prefixes) for the PLR 1105 and sets of advertised routes 1440 and 1445 for the TLRs 1110 and 1115, respectively.

As shown, the process 1300 begins by receiving (at 1305) a connection of a northbound interface of a TLR to a southbound interface of a PLR. In some embodiments, the administrator of the TLR (e.g., a tenant of a datacenter) configures the TLR to connect to a particular PLR that the PLR administrator (e.g., the datacenter owner) has made available. In some embodiments, the TLR connects to a specific PLR interface made available for the specific TLR. For example, in FIG. 11, the TLR 1110 connects via its northbound router link interface R1 to the southbound interface D1 of the PLR 1105, while the TLR 1115 connects via its northbound router link interface R2 to the southbound interface D2 of the PLR 1105.

The process then determines (at 1310) whether any network address prefixes (e.g., IPv4 address prefixes in CIDR notation) are advertised by the TLR. When no prefixes are advertised by the TLR, the process ends. As described above, in some embodiments the administrator of a lower tier logical router (e.g., the TLR) may opt for the lower tier logical router to advertise one or more routes to the logical router to which it connects in the higher tier (e.g., the PLR). Though shown in FIG. 13 as a linear process, it should be understood that the configuration for a TLR may be modified during the operation of the logical network. For instance, the TLR could be connected to a PLR and be implemented within the physical network of a datacenter without any route advertisement, and the TLR administrator could then later on modify the TLR configuration to set advertisement for one or more network address prefixes. In these cases, the same operations to validate or reject an advertised prefix would be performed.

The purpose of this advertisement for a particular network address prefix (i.e., subnet) is for the PLR to forward traffic directed to network addresses covered by the prefix to the TLR. For example, a logical switch having the subnet might attach to the TLR, with data compute nodes (e.g., VMs, containers, etc.) having network addresses in that subnet attached to the logical switch. Advertising the route allows the TLR to attract traffic directed to those data compute nodes. However, in some cases the network addresses of a logical switch might be private addresses that are only used within the tenant's portion of a logical network (e.g., to communicate with data compute nodes on other logical switches that connect to the TLR), and therefore should not be advertised via the PLR.

Figure 14:
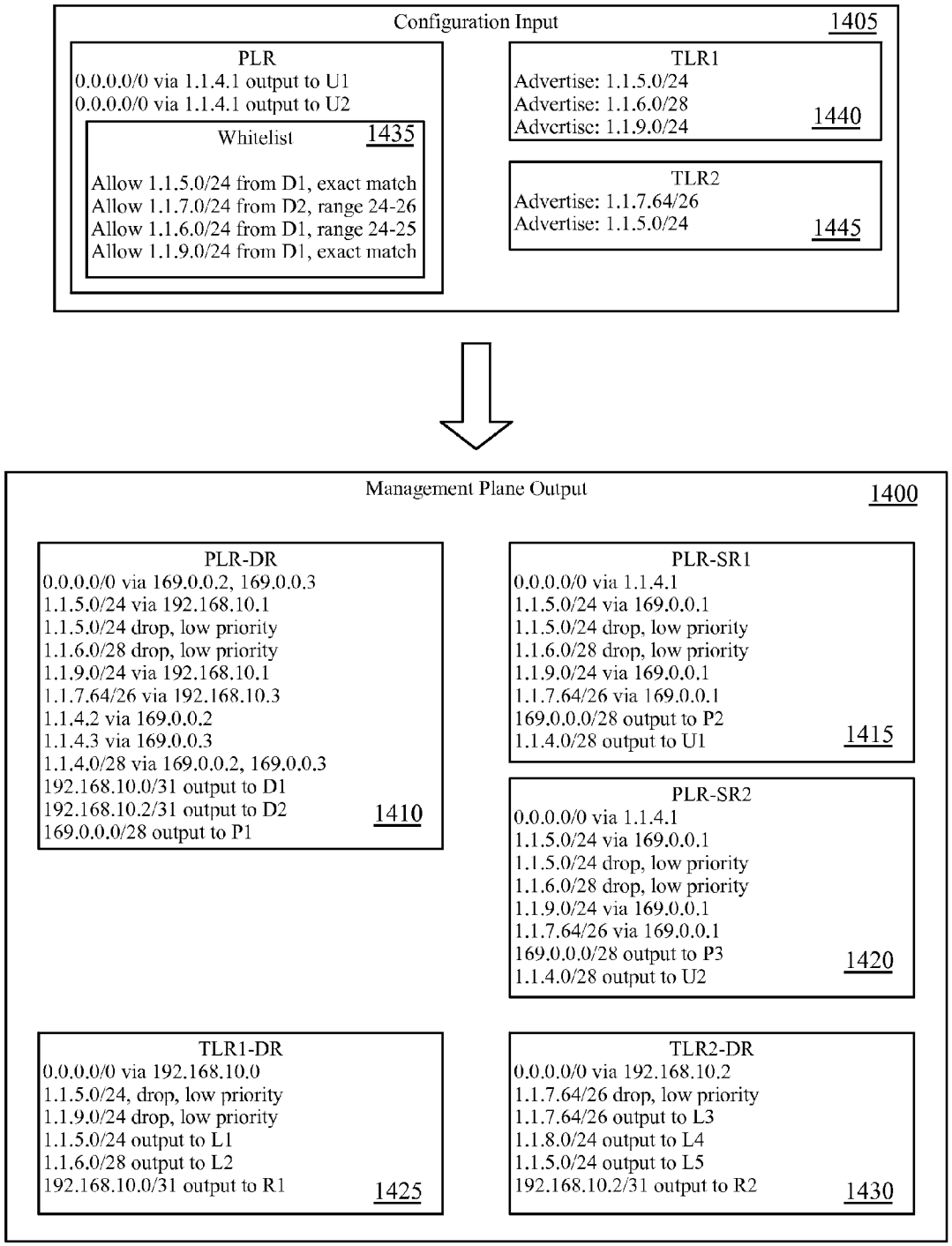
FIG. 14 illustrates configuration information received (e.g., through an API) and the management plane output for the routing tables of the SRs and DRs of the PLR and TLRs of FIG. 11.

In the example of FIG. 14, the first TLR 1110 has been configured to advertise the prefixes 1.1.5.0/24, 1.1.6.0/28, and 1.1.9.0/24. As discussed below, a TLR need not actually have a connected logical switch for a subnet in order to advertise that subnet, as in the case of the prefix 1.1.9.0/24. The second TLR 1115 has been configured to advertise the prefixes 1.1.7.64/26 and 1.1.5.0/24. As also discussed below, the PLR has a mechanism for handling the situation when multiple TLRs are advertising the same prefix, as in this case with the prefix 1.1.5.0/24.

When at least one prefix is advertised by the TLR (or if, later on, the TLR configuration is modified to include advertisement of a prefix), the process 1300 selects (at 1315) one of the advertised prefixes. The process then determines (at 1320) whether the selected prefix is allowed on the PLR for route advertisement from the southbound interface of the PLR to which the TLR connects.

In some embodiments, the PLR is configured with a "whitelist" that specifies the allowed network prefixes for route advertisements received through each of its interfaces. That is, an advertised prefix is only allowable if the whitelist includes a match for the prefix on the specific logical interface to which the TLR that is advertising the route connects. Thus, if a particular TLR is advertising a specific network prefix, the management plane will not add a route to the routing table of the PLR if the specific network prefix is listed in the whitelist but for a different interface than the one to which the particular TLR attaches.

In addition, the set of allowable routes specifies in some embodiments, for each allowable prefix, whether only the exact prefix is allowed or whether a range of prefixes may be allowed. For instance, the set of allowable routes might allow routes for the prefix 10.0.0.0/24, but also allow routes for the "/25" prefixes as well by setting a prefix range of 24-25. This would allow routes for the prefixes 10.0.0.0/24, 10.0.0.0/25, and 10.0.0.128/25, but would not allow routes for "/26" or longer prefixes that are subsets of the specified shorter prefix 10.0.0/24. As is commonly known, a "/x" IPv4 address prefix specifies a subnet that includes all addresses with the first x bits of the 32-bit IPv4 address set to the value specified in the address. Thus, a prefix of 10.0.0.0/24 specifies all addresses that start with 10.0.0; that is, the last eight bits are wildcarded. As such, this subnet will include two "/25" subnets, four "/26" subnets, etc.

In the example, the configuration data for the PLR 1105 includes a whitelist 1435. This whitelist 1435 specifies to allow three sets of network prefixes on the interface D1 (i.e., from the first TLR 1110): 1.1.5.0/24, an exact match; 1.1.6.0/24, allowing both that prefix and its "/25" sub-prefixes; and 1.1.9.0/24, also an exact match. The whitelist 1435 also allows only a single advertised prefix on the interface D2 (i.e., from the second TLR 1115): 1.1.7.0/24, with a prefix range of 24-26 so that the "/24" prefix, its two "/25" sub-prefixes, and its four "/26" sub-prefixes are all allowed.

The management plane determines whether each of the advertised routes from the TLR configurations 1440 and 1445 are allowed. From the first TLR 1110, the route for 1.1.5.0/24 is allowed, as it is an exact match for the first entry in the whitelist 1435. The route for 1.1.6.0/28, however, is outside of the allowed prefix range for this subnet, and therefore would be blocked. Specifically, the prefix 1.1.6.0/24 is allowed by the PLR 1105, but only its two "/25" sub-prefixes are allowed by the third entry in the whitelist 1435 (and not the longer "/28" prefixes). The route for 1.1.9.0/24 is also an exact match that is allowed by the last entry in the whitelist 1435.

As for the second TLR 1115, the route for 1.1.5.0/24 is not allowed. Specifically, the first entry in the whitelist includes this prefix, but only for sending to the TLR attached to interface D1 (i.e., the first TLR 1110, and not the second TLR 1115). The route for 1.1.7.64/26, on the other hand, is allowed based on the second entry of the whitelist 1435. This entry allows advertised routes from interface D2 for the prefix 1.1.7.0/24 as well as its "/25" and "/26" sub-prefixes. 1.1.7.64/26 is one of the four "/26" sub-prefixes of 1.1.7.0/24, and is therefore an allowable route.

When the selected advertised prefix is not allowed by the PLR configuration, in some embodiments the process adds (at 1325) a low priority null route for the prefix to the PLR (i.e., a route specifying to drop packets with addresses that match the prefix. The null routes are added to prevent packets for the specified prefix from being sent to one of the TLRs when those packet should not be (e.g., if the data compute nodes behind that TLR with network addresses in that prefix are trying to induce incoming traffic to their non-public network addresses). As shown in the management plane output 1400 of FIG. 14, for the blocked prefixes 1.1.5.0/24 (from the second TLR 1115) and 1.1.6.0/28 (from the first TLR 1110), the management plane adds a low priority route for each of these prefixes to the routing tables 1410-1420 of the SR 1230 and 1240 and DR 1225. In some embodiments, the null route is only added to the SRs (and not the DR) of the PLR, as the purpose is to handle incoming packets for those IP addresses, and dropping the packets at the SR will ensure that these packets are dropped. Other embodiments only add the null route to the DR (or add to both the DR and the SRs, as in this case), to ensure that traffic from other TLRs sent to the address is not directed to the TLR advertising the prefix.

Other embodiments, however, do not add these low priority null routes, on the premise that the TLRs should not be able to induce traffic to their non-public addresses without the PLR advertising the routes. In such embodiments, the low priority "drop" routes for 1.1.5.0/24 and 1.1.6.0/28 would not be added to the DR or SR routing tables 1410-1420. In this case, only the operation 1327 (described below) is performed in response to a prefix not being allowed.

When the selected advertised prefix is not allowed by the PLR configuration, the process 1300 also generates (at 1327) an authorization failure log for the advertised route. In some embodiments, this log indicates the TLR that advertised the route, the specific route advertised, and/or the reason the prefix was not allowed (e.g., the prefix is not whitelisted at all, or the prefix is too specific but is a subset of an allowable prefix). In some embodiments, the administrator of the TLR may see this authorization log so as to correct the route advertisement, while the administrator of the PLR can view the authorization failure log to determine either that one of the tenants is attempting to illicitly advertise routes or to identify that they should add the route to the PLR whitelist.

When the selected prefix is allowed by the PLR configuration (i.e., by the PLR's whitelist), then the process 1300 adds routes to the routing tables of the PLR and DR components. Specifically, the process adds (at 1330) a route to the DR of the PLR with the address of the northbound interface of the TLR as the next hop, (at 1335) a route to each SR of the PLR with the address of the northbound interface of the DR (of the PLR) as the next hop, and (at 1340) a low priority null route to the TLR.

These routes cause the PLR to forward traffic with a destination address that matches the prefix (i.e., in the subnet defined by the prefix) to the appropriate TLR. That is, when a packet is received from the external network, the receiving SR (as implemented in a gateway) will logically forward the packet to the DR of the PLR (causing the packet to be physically forwarded to the MFE on the gateway). The MFE (which is one of many MFEs that implements the DR of the PLR as well as the DR of the SR and the logical switch attached to the SR) identifies that the DR of the PLR logically routes the packet to the DR of the TLR, which logically routes the packet to the appropriate logical switch, which identifies a logical egress port corresponding to the destination address (e.g., the destination MAC address) of the packet (this ignores the processing of the transit logical switches, which also takes place on the same MFE). At this point, the MFE tunnels the packet to the MFE to which the destination data compute node connects for delivery to that data compute node. The packet processing of some embodiments is described in greater detail in U.S. patent application Ser. No. 14/814,473, filed Jul. 30, 2015, now issued as U.S. Pat. No. 9,787,605, which is incorporated herein by reference.

In FIG. 14, the prefix 1.1.5.0/24 is advertised by the first TLR 1110 and accepted by the PLR 1105, and thus the routing tables 1415 and 1420 for each of the SRs include routes 1.1.5.0/24 with a next hop of 169.0.0.1, which is the northbound interface of the DR 1225. In addition, the routing table 1410 for the DR of the PLR includes a route for 1.1.5.0/24 with a next hop of 192.168.10.1. Similarly, the prefix 1.1.9.0/24 is advertised by the TLR 1110 and accepted by the PLR 1105, so corresponding routes are added to the routing tables 1410-1420. For the prefix 1.1.7.64/26 advertised by the second TLR 1110, the routing tables 1415 and 1420 for the SR have routes with the same next hop (1.1.7.64/26 via 169.0.0.1), as these still point to the same DR interface. However, the DR routing table 1410 has a route for this prefix with a next hop address of 192.168.10.3, so that packets will be routed to the second TLR 1115.

In some embodiments, adding the routes to the SRs also allows the SRs to advertise these routes to the external network so as to attract traffic for those network addresses. For example, the gateways of some embodiments on which the SRs are implemented run a routing protocol (such as BGP or OSPF) to advertise these routes to the routers on the external network (e.g., the external router with an interface address of 1.1.4.1 to which both of the SRs connect) and to receive routes advertised by that router. The route advertisement to external networks of some embodiments is described in further detail in U.S. patent application Ser. No. 14/814,473, filed Jul. 30, 2015, now issued as U.S. Pat. No. 9,787,605, and Ser. No. 14/214,561, filed Mar. 14, 2014, now issued as U.S. Pat. No. 9,590,901, as well as U.S. Provisional Patent Application 62/143,086, filed Apr. 4, 2015. U.S. application Ser. No. 14/814,473, now issued as U.S. Pat. No. 9,787,605, U.S. application Ser. No. 14/214,561, now issued as U.S. Pat. No. 9,590,901, and U.S. Provisional Application 62/143,086, are incorporated herein by reference.

As indicated, when an advertised prefix is accepted, the TLR that advertises the route adds a low priority null route for the prefix (i.e., specifying to drop packets sent to addresses that match the prefix) to its routing table. For example, the routing table 1425 for the first TLR 1110 includes low priority null routes for 1.1.5.0/24 and 1.1.9.0/24, its advertised and accepted prefixes. Similarly, the routing table 1430 includes a low priority null route for 1.1.7.64/26, its advertised and accepted prefix.

These routes prevent never-ending loops in the case that a TLR advertises a route for a prefix associated with a logical switch that is not yet set up. In some embodiments, when a logical switch is attached to a logical router, that logical router will have a connected route for the subnet. For instance, the routing table 1425 includes connected routes for 1.1.5.0/24 (to output to logical interface L1), 1.1.6.0/28 (to output to logical interface L2), and for 192.168.10.0/31 (to output to logical interface R1, for the transit logical switch through which it connects to the PLR 1105). Correspondingly, the routing table 1425 includes connected routes for 1.1.7.64/26 (to output to logical interface L3), 1.1.8.0/24 (to output to logical interface L4), 1.1.5.0/24 (to output to logical interface L5), and for 192.168.10.2/31 (to output to logical interface R2, for the transit logical switch through which it connects to the PLR 1105). In this case, the connected routes are of a higher priority than the null routes, so packets addressed to the data compute nodes on these logical switches will not be dropped.

However, the advertised prefix 1.1.9.0/24 does not correspond to a logical switch attached to the first TLR 1110, and thus there is no connected route for this prefix. As such, without the null route, packets would be routed according to the default route (0.0.0.0/0 via 192.168.10.0), which sends the packets to the DR of the PLR. The PLR, of course, is configured to route such packets to the TLR based on the route advertisement, and these would create a never-ending loop. Thus, the routing table 1425 includes the null route so that these packets are dropped until a logical switch with the specified subnet is attached to the TLR 1110.

The routing tables 1410-1420 for the PLR also include other routes. For instance, the DR includes default routes to send packets to the two SRs (e.g., using ECMP principles), as well as connected routes for its interfaces and routes relating to the uplinks and the subnet on which the uplinks are located. The SRs include default routes to send packets to the external physical router as well as their respective connected routes. In addition, non-default static routes may be configured for the TLRs and/or PLR in some embodiments.

Returning to the FIG. 13, after adding the required routes the process 1300 determines (at 1345) whether additional prefixes are advertised by the TLR. When additional prefixes require processing, the process returns to 1315 to select the next advertised prefix. Otherwise, the process ends.

IV. Handling of NAT Addresses

In some embodiments, the lower tier logical routers (e.g., the TLRs) may use network address translation (NAT) to translate addresses of packets sent from data compute nodes in their portion of the logical network (e.g., data compute nodes that logically connect to logical switches which, in turn, logically connect to the lower tier logical router). If these packets are sent to the external physical network through the higher tier logical router (e.g., the PLR), then return packets (addressed to the address used for translation) will need to be routed by the PLR to the appropriate TLR. As such, when a NAT configuration is received for the TLR, some embodiments automatically advertise a route for the NAT network address (i.e., the address to which the TLR translates the source address of outgoing packets) to the PLR.

In addition, while this section describes the auto-advertisement of routes for NAT rules, it should be understood that users may want to configure other services that should attract traffic as well, and that routes for addresses associated with such services will be similarly advertised by the TLR and approved or rejected in a similar manner by the PLR of some embodiments. For example, a tenant might configure a load balanced virtual server having a single public IP address, in which case this address would be automatically advertised by the TLR (and subsequently approved or rejected by the PLR configuration).

In some embodiments, as described above, the configuration for the PLR specifies whether to accept or reject the advertised route based on its set of allowable routes, and the route is only added to the routing table for the second logical router when the NAT address is allowed for the interface to which the first logical router connects. Some embodiments allow the PLR to be configured to allow routes from a particular TLR or any TLR for any address so long as the routes are specified as NAT routes. In other embodiments, however, the PLR is configured to allow routes only for NAT addresses within a specific pool of addresses, and therefore only add a route for a particular NAT address if the NAT address is within that pool. In yet other embodiments, the TLR advertises the entire block of possible NAT addresses (i.e., as a network prefix) rather than advertising only the addresses that are in use, and the PLR determines whether to allow a route for the network prefix as described in the above section.

Figure 15:
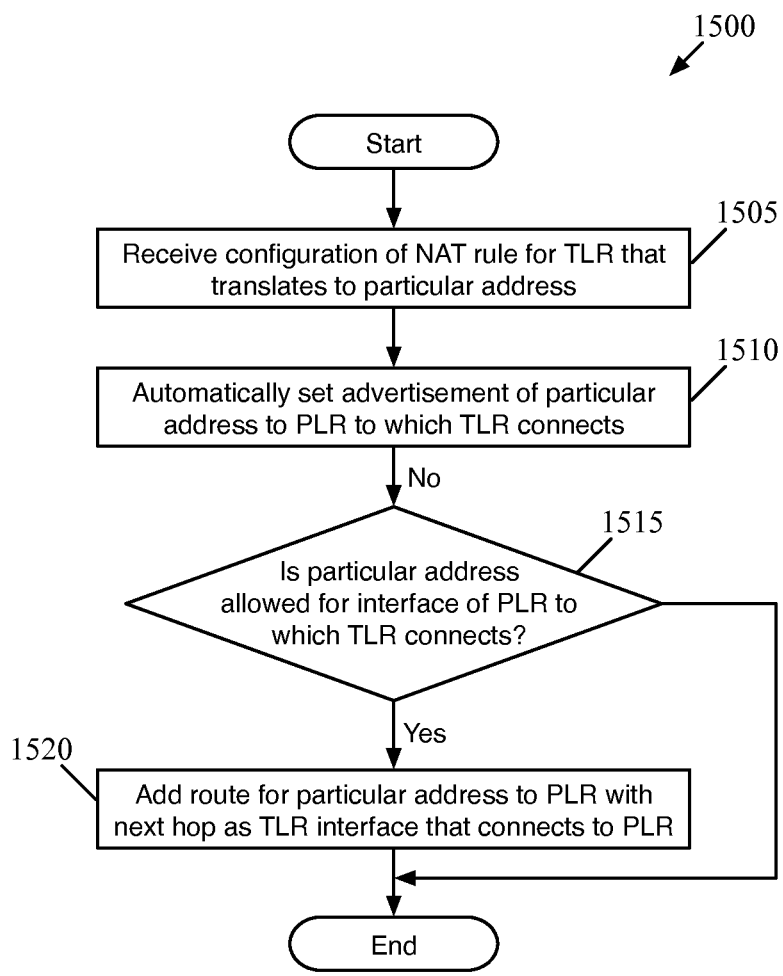
FIG. 15 conceptually illustrates a process of some embodiments for generating PLR routes based on NAT rules of TLRs that connect to the PLR.

FIG. 15 conceptually illustrates a process 1500 of some embodiments for generating PLR routes based on NAT rules of TLRs that connect to the PLR. While explained here in terms of TLRs and PLRs, it should be understood that the principles regarding propagation of routes to a higher tier logical router for NAT rules of a lower tier logical router may apply to any type of hierarchical structure of logical routers, including logical routers arranged across more than two tiers. The process 1500 of some embodiments is performed by a network controller or set of network controllers that manages one or more of the TLR and the PLR (i.e., by the management plane or central control plane that the network controller implements). The process 1500 generates some of the routes in the routing tables of the PLR and TLR components; it should be understood that other routes will be generated by other processes performed by the network controllers. Once the routing tables are generated, this data is propagated to managed forwarding elements and gateways that implement the logical routers (e.g., through local controllers operating alongside the managed forwarding elements).

As shown, the process 1500 begins by receiving (at 1505) a configuration of a NAT rule for a TLR that translates one or more network addresses to a particular network address or set of network addresses. The NAT rules, in some cases, may be received via user input (e.g., through an API). In other cases, however, the NAT rules are automatically generated as needed. For example, configuration data might specify a pool of NAT addresses available for a particular TLR (or a particular logical switch on a TLR), with the rules assigned as needed for specific source IP addresses of the data compute nodes on the logical switch. If an IP address pool of 143.5.5.0/28 is configured for a set of data compute nodes that attach to a logical switch, then whenever a particular data compute node IP address is assigned a particular NAT address in the pool, a rule is generated for the TLR and evaluated for the PLR.

The process automatically sets (at 1510) the advertisement of the particular address to the PLR to which the TLR that uses the rule connects. That is, when a NAT configuration rule is received (either through the API or through the automatic assignment of a NAT address during operation), the management plane automatically pushes this rule up to the PLR. In some embodiments, the advertisement specifies that the address is a NAT address, and uses a different mechanism to provide the data (e.g., writing the data to a NAT rules table used by the network controller as input, as opposed to writing the data to a route advertisement table).

Upon receiving the NAT rule and the advertisement thereof to the PLR, the process determines (at 1515) whether the particular address is allowed (i.e., for route advertisement) for the interface of the PLR to which the TLR connects. Different embodiments enable the provision of NAT rules differently. In some embodiments, the PLR administrator sets a flag in the set of allowed routes for a particular interface to allow all NAT rules, irrespective of the IP address (i.e., so long as the address is identified as a NAT address). In this case, whenever the TLR adds, modifies, or removes a NAT rule, the change will be automatically reflected in the routing tables of the PLR. In other embodiments, the PLR administrator sets a specific pool of network addresses (e.g., a prefix indicating an address range, or a pool of disparate addresses) within which NAT rules will be allowed for the PLR. In this case, whenever the PLR adds a route within the pool, the address will be allowed (and thus reflected in the PLR routing tables). On the other hand, when a NAT rule is added that does not use as the NAT address one of the allowed addresses, the management plane will not add the route to the PLR.

When the particular address is allowed, the process adds (at 1520) a route for the particular address to the PLR with the next hop as the TLR interface that connects to the PLR (i.e., of the TLR that set the particular NAT rule). As described above with reference to FIG. 13, adding this route to the PLR in fact involves (i) adding a route to the DR of the PLR that has the TLR interface as its next hop and (ii) adding a route to each of the SRs of the PLR that has the northbound DR interface as its next hop.

In some embodiments, the management plane also adds a low priority null for the address to the TLR routing tables as well. In other embodiments, because the NAT rule will always handle incoming traffic to that address (specifying to translate the address to the address of the data compute node), the null route is not necessary, so long as the management plane will remove or modify the routes in the PLR when the NAT rule is removed or modified. In addition, some embodiments require that the TLR have both SRs (e.g., in active-standby mode) and a DR when using NAT. For example, if the TLR is assigning NAT addresses (and/or ports) on the fly based on a pool of available addresses, this stateful information may require the centralized functionality of an SR. In other embodiments, so long as all of the NAT configuration rules (i.e., 1:1 NAT rules) come from the central controllers, and no stateful information is needed, then the TLR may be implemented in a solely distributed manner.

Figure 16:
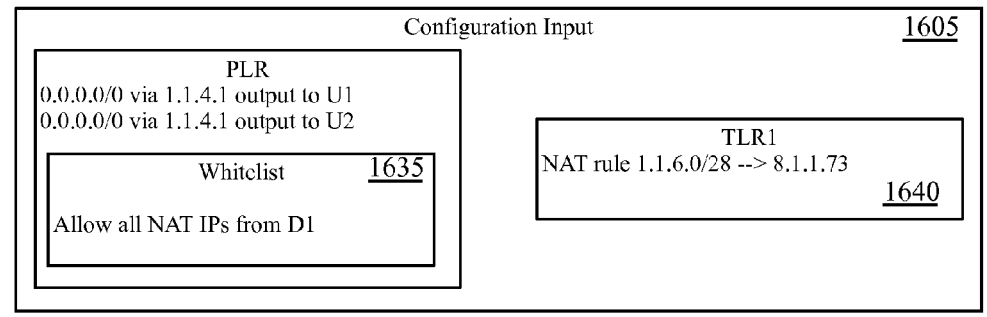
FIGS. 16-18 conceptually illustrate different ways in which the NAT rules may be configured for a TLR and routes for those NAT rules accepted in a PLR.
Figure 16:
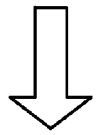
Figure 16:
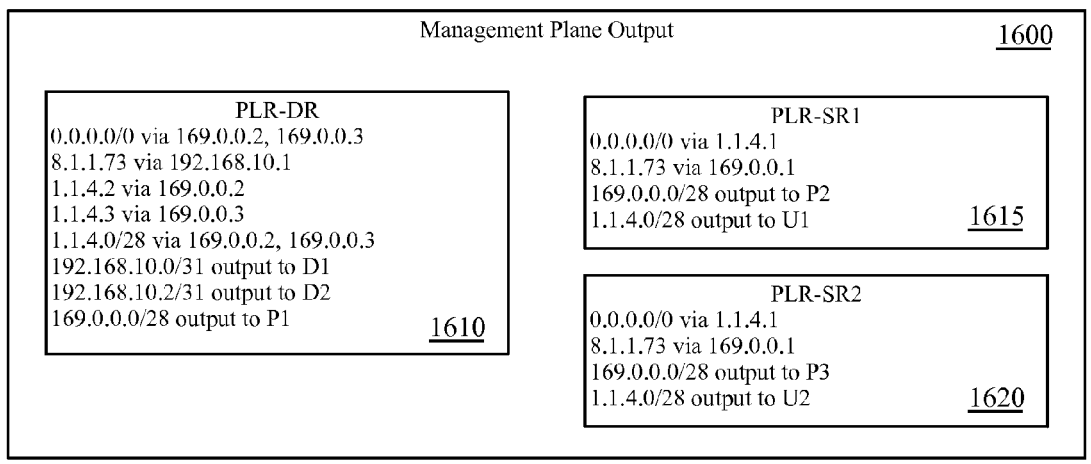
Figure 17:
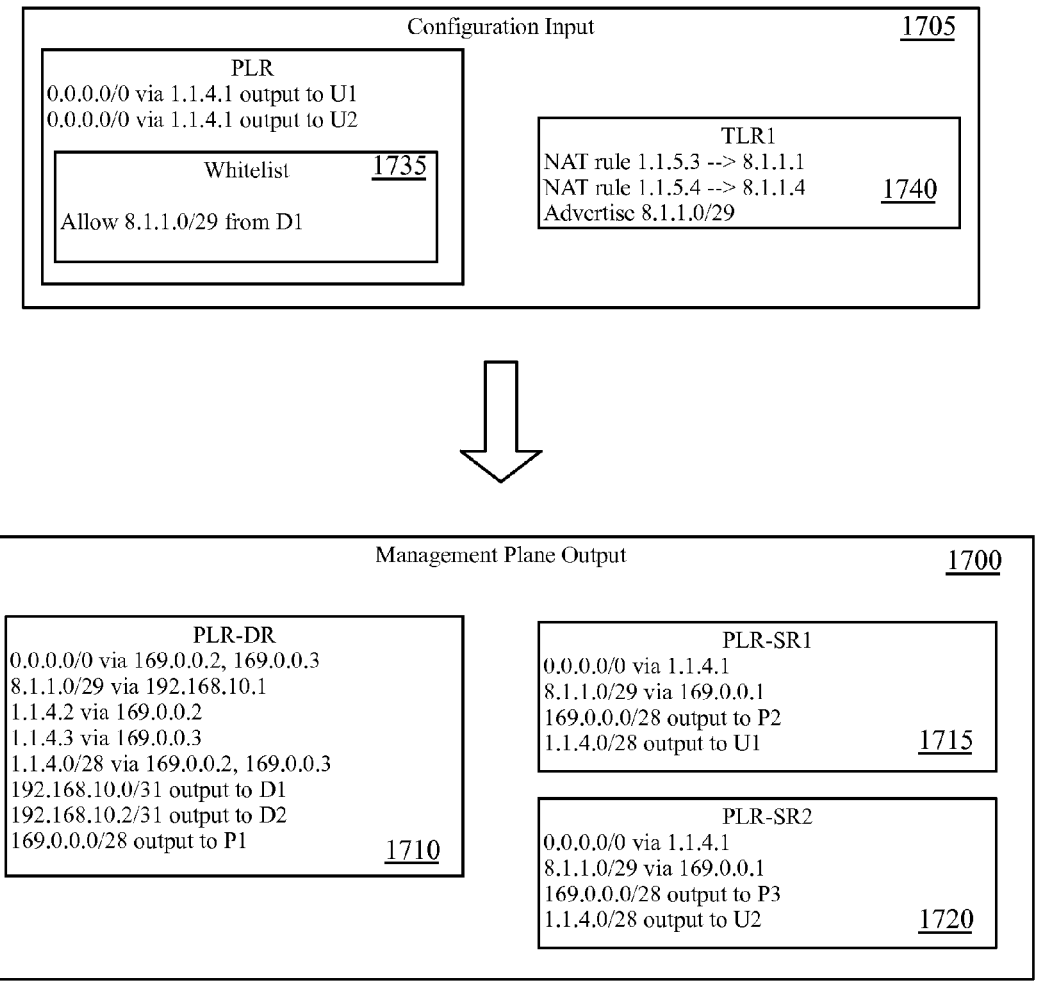
Figure 18:
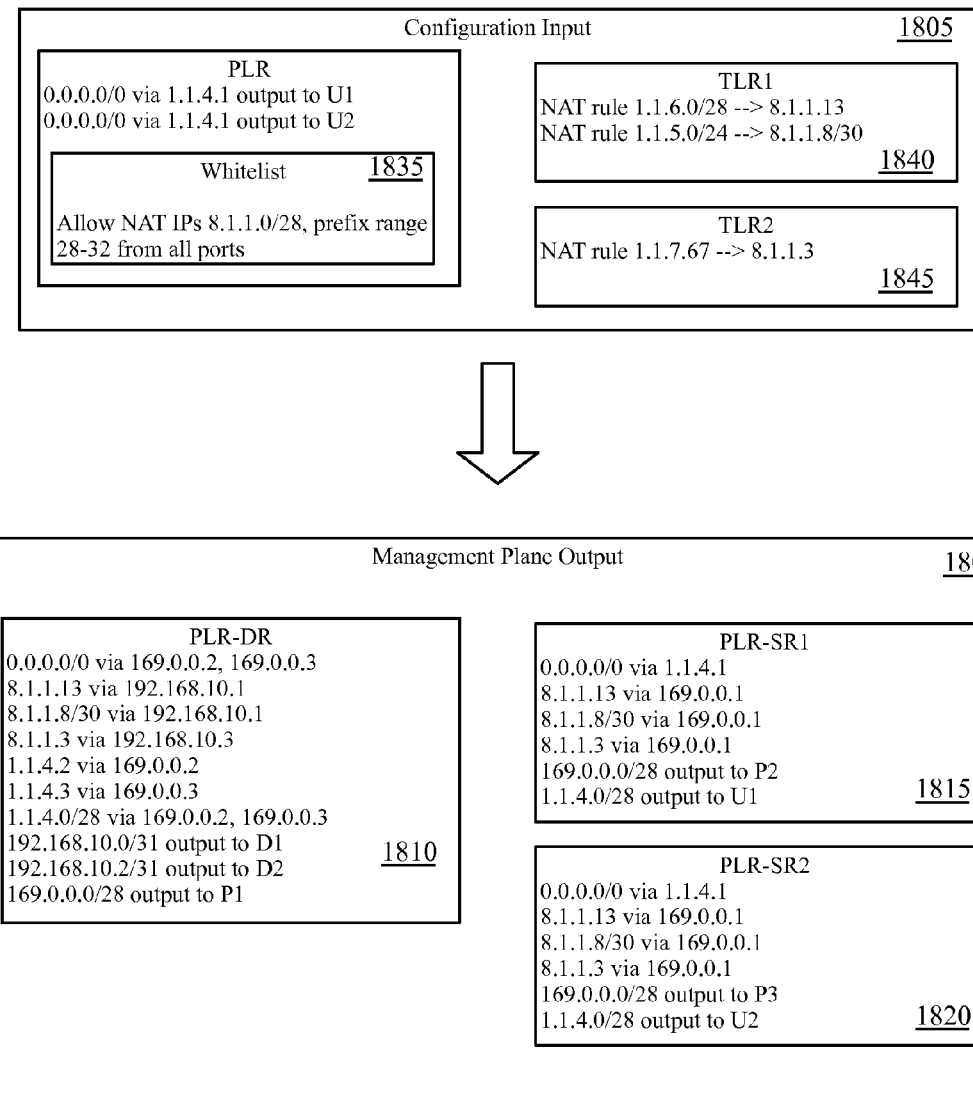

FIGS. 16-18 conceptually illustrate different ways in which the NAT rules may be configured for a TLR and routes for those NAT rules accepted in a PLR. Specifically, each of these figures shows NAT configuration data for one or more of the TLRs 1110 and 1115 of FIG. 11 as well as a whitelist for the PLR 1105 indicating allowable advertised routes for the TLR interfaces.

FIG. 16 illustrates an example in which the PLR whitelists all NAT IP addresses from a particular interface. As shown in the configuration data 1605, the PLR configuration includes a whitelist 1635 that specifies to allow all NAT IPs from the interface D1 (i.e., the interface to which the TLR 1110 connects). The TLR configuration 1640 includes a NAT rule specifying that all IP addresses in the subnet 1.1.6.0/28 (i.e., all packets sent by data compute nodes on the second logical switch 1130) should be converted to the address 8.1.1.73. This rule might exist if 8.1.1.73 was the only public IP address assigned for the tenant that owns the TLR and its logical switches, and all of the data compute nodes on the second logical switch 1130 perform equivalent functionality (e.g., as separate copies of a webserver). In this case, some embodiments require that the TLR 1110 include both a set of active-standby SRs in addition to the DR, so that the SR can handle the NAT. Because all of the data compute nodes on the logical switch 1130 use the same IP address, connections will be differentiated based on the source transport layer port, and the SR is needed to keep track of this state and perform the appropriate NAT on the destination IP addresses of incoming packets (i.e., to convert the address 8.1.1.73 into the appropriate address based on the destination transport layer port).

The management plane output 1600 illustrates the routing tables 1610-1620 of the three components 1225, 1230, and 1240 of the PLR 1105 based on the configuration 1605. In addition to the various default and connected routes and the DR routes relating to the uplink IP addresses, the routing tables 1610-1620 include routes for the IP address 8.1.1.73. Specifically, the DR routing table 1610 includes a route 8.1.1.73 via 192.168.10.1 routing packets sent to this address to the northbound interface of the TLR 1110. As mentioned, in some embodiments this northbound interface is implemented by active and standby SRs, with a preference to send the packet to the active SR implementation when it is available. The routing tables 1615 and 1620 include a route 8.1.1.73 via 169.0.0.1, which routes packets sent to this address to the northbound interface of the DR 1225.

FIG. 17 illustrates the case in which the TLR simply advertises its pool of NAT addresses in the same manner as described in the previous section. The TLR can then configure NAT rules which need not be separately pushed to the PLR (so long as those NAT rules translate to IP addresses within the advertised pool). Specifically, as shown, the PLR whitelist 1735 allows the prefix 8.1.1.0/29, irrespective of whether this is a NAT rule. The TLR configuration 1740 advertises this prefix 8.1.1.0/29, which is accepted by the PLR based on its whitelist 1735.

The TLR configuration 1740 includes two NAT rules, that packets from 1.1.5.3 be translated to 8.1.1.1 and that packets from 1.1.5.4 be translated to 8.1.1.4. These rules need not be separately pushed to the PLR, as the IP addresses 8.1.1.1 and 8.1.1.4 both match the prefix 8.1.1.0/29 and therefore will be handled by the route for that prefix. As shown, the routing table 1710 for the DR of the PLR 1105 includes a route 8.1.1.0/29 via 192.168.10.1 to route packets to the interface of the TLR 1110, and the routing tables 1715 and 1720 have routes 8.1.1.0/29 via 169.0.0.1 to route packets to the DR 1225.

FIG. 18 illustrates the case in which the PLR whitelist allows NAT rules advertised by any TLR so long as the NAT IP address is within a contiguous pool of addresses (i.e., a prefix range). As the TLRs configure NAT rules, the rules are pushed to the PLR, and routes generated for those NAT rules by the management plane. As shown, the PLR whitelist 1835 allows NAT IPs for all ports so long as the IP is within the subnet defined by the prefix 8.1.1.0/28. In addition, the whitelist rule allows all prefix ranges, from the full subnet to "/32" single network addresses.

Both of the TLR configurations 1840 and 1845 specify NAT rules that translate to IP addresses within the allowed prefix. Specifically, the configuration 1840 for the first TLR 1110 specifies to translate IP addresses from the second logical switch 1.1.6.0/28 to the single address 8.1.1.13, and to translate IP addresses from the first logical switch 1.1.5.0/24 to the four addresses in the prefix 8.1.1.8/30 (8.1.1.8, 8.1.1.9, 8.1.1.10, and 8.1.1.11). Both of these rules, in some embodiments, require the management plane to define both active-standby SRs in addition to a DR for the first TLR 1110, as the assignment of IP/port combinations requires the maintenance of state. For the second TLR 1115, the configuration 1845 specifies a single 1:1 NAT rule, translating the address 1.1.7.67 to the address 8.1.1.3. In some embodiments, such 1:1 rules, when generated by the management plane, do not require the use of a centralized SR for the TLR.

The whitelist 1835 for the PLR 1105 allows all three of the NAT rules pushed by the TLR configurations 1840 and 1845. As such, the DR 1810 includes three routes that correspond to these rules. The routes specify that packets with destination addresses 8.1.1.13 and that match the prefix 8.1.1.8/30 are routed to the next hop 192.168.10.1 (i.e., the northbound interface of the first TLR 1110, while packets with the destination address 8.1.1.3 are routed to the next hop 192.168.10.3 (the northbound interface of the second TLR 1115). Routes for all three of these addresses (8.1.1.13, 8.1.1.8/30, and 8.1.1.3) are added to the SR routing tables 1815 and 1820 with the same next hop of 169.0.0.1, the northbound interface of the DR.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
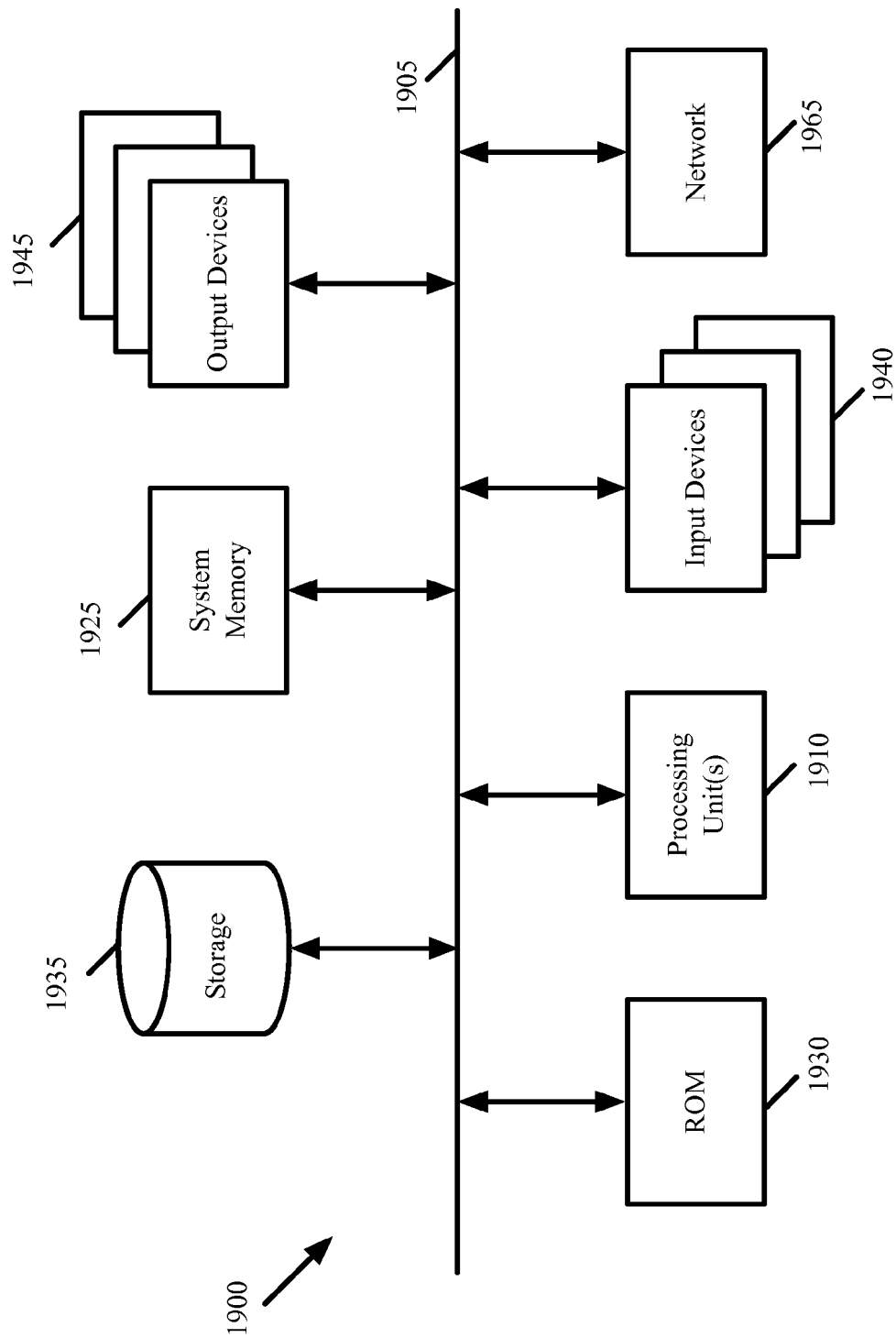
FIG. 19 conceptually illustrates an electronic system with which some embodiments of the invention are implemented.

FIG. 19 conceptually illustrates an electronic system 1900 with which some embodiments of the invention are implemented. The electronic system 1900 can be used to execute any of the control, virtualization, or operating system applications described above. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, 13 and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a set of logical routers in a logical network, the method comprising:

receiving (i) a configuration for a first logical router comprising an advertised route and (ii) a configuration for a second logical router comprising a set of allowable routes for the second logical router to include in its routing table, wherein the first logical router connects to the second logical router;

determining whether the set of allowable routes for the second logical router includes the advertised route as an allowed route from the first logical router;

only when the advertised route is an allowed route from the first logical router, adding the advertised route to a routing table for at least one component of the second logical router; and distributing data regarding the routing table to a plurality of physical machines that implement the second logical router.

2. The method of claim 1, wherein the first logical router connects to the second logical router via a particular logical interface of the second logical router.

3. The method of claim 2, wherein determining whether the advertised route is an allowed route from the first logical router comprises determining whether the advertised route is allowed for the particular interface.

4. The method of claim 1, wherein distributing data regarding the routing table to plurality of physical machines that implement the second logical router comprises providing the data to local controllers operating on the plurality of physical machines.

5. The method of claim 1, wherein at least a subset of the plurality of physical machines further implement the first logical router.

6. The method of claim 1, wherein the second logical router comprises (i) a distributed routing component implemented by a plurality of physical machines and (ii) one or more centralized routing components each implemented by a single physical machine, wherein the centralized routing components provide connectivity to an external network to the first logical router.

7. The method of claim 6, wherein each of the routing components of the second logical router has a corresponding routing table, wherein adding the advertised route to the routing table for at least one component comprises:
- adding a route to the corresponding routing table for the distributed routing component, said added route for the distributed routing component having a next hop address corresponding to an interface of the first logical router; and
- adding a route to the corresponding routing table for each of the centralized routing components, said added routes for the centralized routing components each having a next hop address corresponding to an interface of the distributed routing component internal to the second logical router.

8. The method of claim 6, wherein each of the centralized routing components advertises the advertised route to at least one external physical router.

9. The method of claim 1, wherein the advertised route is a route for a particular subnet, the method further comprising adding, to a routing table for at least one component of the first logical router, a first route specifying to drop packets addressed to the network addresses in the particular subnet.

10. The method of claim 9 further comprising, when a logical switch for the particular subnet is configured to connect to the first logical router via a particular interface of the first logical router, adding to the routing table for the at least one component of the first logical router a second route for the particular subnet that specifies to logically output packets addressed to the network addresses in the particular subnet to the particular logical interface of the first logical router, wherein the second route has a higher priority than the first route.

11. The method of claim 1, wherein the set of allowable routes specifies, for a particular route, a prefix for the route and a set of allowable prefix ranges of the specified prefix.

12. A machine readable medium storing a program which when executed by at least one process unit implements a logical router in a logical network, the program comprising sets of instructions for:
- receiving (i) a configuration for a first logical router comprising an advertised route and (ii) a configuration for a second logical router comprising a set of allowable routes for the second logical router to include in its routing table, wherein the first logical router connects to the second logical router;
- determining whether the set of allowable routes for the second logical router includes the advertised route as an allowed route from the first logical router;
- only when the advertised route is an allowed route from the first logical router, adding the advertised route to a routing table for at least one component of the second logical router; and
- distributing data regarding the routing table to a plurality of physical machines that implement the second logical router.

13. The machine readable medium of claim 12, wherein the first logical router connects to the second logical router via a particular logical interface of the second logical router.

14. The machine readable medium of claim 13, wherein the set of instructions for determining whether the advertised route is an allowed route from the first logical router comprises a set of instructions for determining whether the advertised route is allowed for the particular interface.

15. The machine readable medium of claim 12, wherein at least a subset of the plurality of physical machines further implement the first logical router.

16. The machine readable medium of claim 12, wherein the second logical router comprises (i) a distributed routing component implemented by a plurality of physical machines and (ii) one or more centralized routing components each implemented by a single physical machine.

17. The machine readable medium of claim 16, wherein each of the routing components of the second logical router has a corresponding routing table, wherein the set of instructions for adding the advertised route to the routing table for at least one component comprises sets of instructions for:
- adding a route to the corresponding routing table for the distributed routing component, said added route for the distributed routing component having a next hop address corresponding to an interface of the first logical router; and
- adding a route to the corresponding routing table for each of the centralized routing components, said added routes for the centralized routing components each having a next hop address corresponding to an interface of the distributed routing component internal to the second logical router.

18. The machine readable medium of claim 16, wherein each of the centralized routing components advertises the advertised route to at least one external physical router.

19. The machine readable medium of claim 12, wherein the advertised route is a route for a particular subnet, the program further comprising sets of instructions for:
- adding, to a routing table for at least one component of the first logical router, a first route specifying to drop packets addressed to the network addresses in the particular subnet; and
- when a logical switch for the particular subnet is configured to connect to the first logical router via a particular interface of the first logical router, adding to the routing table for the at least one component of the first logical router a second route for the particular subnet that specifies to logically output packets addressed to the network addresses in the particular subnet to the particular logical interface of the first logical router, wherein the second route has a higher priority than the first route.

20. The machine readable medium of claim 12, wherein the program further comprises a set of instructions for adding a null route to the routing table for at least one component of the second logical router when the advertised route is not an allowed route from the first logical router.

* * * * *